US011733587B2

(12) United States Patent
Wu et al.

(10) Patent No.: US 11,733,587 B2
(45) Date of Patent: Aug. 22, 2023

(54) VOICE COIL MOTOR WITH IMPROVED ZOOMING PERFORMANCE

(71) Applicant: LANTO ELECTRONIC LIMITED, Kunshan (CN)

(72) Inventors: Fuyuan Wu, Kunshan (CN); Shangyu Hsu, Kunshan (CN); Yucheng Lin, Kunshan (CN); Mengting Lin, Kunshan (CN); Hsiaokang Li, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 50 days.

(21) Appl. No.: 17/674,949

(22) Filed: Feb. 18, 2022

(65) Prior Publication Data
US 2022/0382126 A1    Dec. 1, 2022

(30) Foreign Application Priority Data
May 28, 2021   (CN) .......................... 202110592638.9

(51) Int. Cl.
*H02K 41/035*    (2006.01)
*H02K 11/215*    (2016.01)
*G03B 5/00*    (2021.01)

(52) U.S. Cl.
CPC ............. *G03B 5/00* (2013.01); *H02K 11/215* (2016.01); *H02K 41/0356* (2013.01); *G03B 2205/0046* (2013.01); *G03B 2205/0069* (2013.01)

(58) Field of Classification Search
CPC ...... H02K 41/00; H02K 41/03; H02K 41/035; H02K 41/0356; H02K 11/00; H02K 11/21; H02K 11/2157; H02K 7/00; H02K 7/14; G03B 30/00; G03B 5/00; G03B 5/02; G02B 7/00; G02B 7/02; G02B 7/04; G02B 7/10;
(Continued)

(56) References Cited

U.S. PATENT DOCUMENTS

| | | | | |
|---|---|---|---|---|
| 9,395,511 | B1* | 7/2016 | Code | G02B 7/08 |
| 2013/0321938 | A1* | 12/2013 | Ohno | G02B 7/09 |
| | | | | 359/824 |
| 2021/0382262 | A1* | 12/2021 | Wu | G02B 7/04 |

FOREIGN PATENT DOCUMENTS

| | | |
|---|---|---|
| CN | 110261985 A | 9/2019 |
| CN | 111061029 A | 4/2020 |
| CN | 111580324 A | 8/2020 |

(Continued)

*Primary Examiner* — Tran N Nguyen
(74) *Attorney, Agent, or Firm* — Birch, Stewart, Kolasch & Birch, LLP

(57) ABSTRACT

A voice coil motor includes a housing, a first lens holder, a second lens holder, a first electromagnetic drive assembly, and a second electromagnetic drive assembly. The first electromagnetic drive assembly generates a first electromagnetic force to drive the second lens holder to move in a moving direction. The second electromagnetic drive assembly is adapted to drive the first lens holder to move along the moving direction. The first magnetic steel portion includes a first magnet and a second magnet. The first coil includes a first wire portion and a second wire portion. When the first coil is conducted, a direction of current in the first wire portion and a direction of current in the second wire portion have at least components in opposite directions. The present disclosure can solve the jam problem when zooming, and also increase the zoom stroke.

20 Claims, 31 Drawing Sheets

(58) Field of Classification Search
CPC ...... G02B 7/102; G02B 13/00; G02B 13/009; G02B 13/32; G02B 13/34
See application file for complete search history.

(56) References Cited

FOREIGN PATENT DOCUMENTS

| | | |
|---|---|---|
| CN | 2116552962 U | 10/2020 |
| WO | WO 2020/258265 A1 | 12/2020 |

* cited by examiner

VOICE COIL MOTOR WITH IMPROVED ZOOMING PERFORMANCE

CROSS-REFERENCE TO RELATED APPLICATION

This patent application claims priority of a Chinese Patent Application No. 202110592638.9, filed on May 28, 2021 and titled "VOICE COIL MOTOR", the entire content of which is incorporated herein by reference.

TECHNICAL FIELD

The present disclosure relates to a voice coil motor, which belongs to a technical field of electronic product photography.

BACKGROUND

A camera module of an electronic product usually includes a focusing unit and a zooming unit arranged in a housing. The focusing unit and the zooming unit cooperate with each other to realize the focusing and zooming of the camera module.

In the prior art, when the zoom function is used, an image displayed on the camera module cannot be directly zoomed in or out, but needs to be analyzed and calculated by software. This causes the zoom function of the camera module to consume a lot of time. As a result, the camera module may be stuck in the zoom application, which affects the normal use of the electronic product.

SUMMARY

An object of the present disclosure is to provide a voice coil motor which reduces the jam phenomenon during zooming and increases the zoom stroke.

In order to achieve the above object, the present disclosure adopts the following technical solution: a voice coil motor, including: a housing, the housing including a first housing and a second housing; a first lens holder, the first lens holder being mounted to the second housing; a second lens holder, the second lens holder being mounted to the first housing; a first electromagnetic drive assembly, the first electromagnetic drive assembly including a first magnetic steel portion and a first coil which cooperates with the first magnetic steel portion to generate a first electromagnetic force; one of the first magnetic steel portion and the first coil being provided on the first housing, the other of the first magnetic steel portion and the first coil being provided on the second lens holder, the first electromagnetic drive assembly being adapted to drive the second lens holder to move in a moving direction; and a second electromagnetic drive assembly, the second electromagnetic drive assembly including a second magnetic steel portion and a second coil which cooperates with the second magnetic steel portion to generate a second electromagnetic force; one of the second magnetic steel portion and the second coil being provided on the second housing, the other of the second magnetic steel portion and the second coil being provided on the first lens holder, the second electromagnetic drive assembly being adapted to drive the first lens holder to move along the moving direction; wherein the first housing includes a first magnetic substance for attracting the first magnetic steel portion, and the second housing includes a second magnetic substance for attracting the second magnetic steel portion; wherein the first magnetic steel portion includes a first magnet and a second magnet, the first magnet includes a first side portion and a second side portion opposite to the first side portion, one of the first side portion and the second side portion is an N pole, the other of the first side portion and the second side portion is an S pole; the second magnet includes a third side portion and a fourth side portion opposite to the third side portion, one of the third side portion and the fourth side portion is an S pole, the other of the third side portion and the fourth side portion is an N pole; the first side portion and the third side portion are located on a same side and have opposite polarities; the second side portion and the fourth side portion are located on a same side and have opposite polarities; wherein the first coil includes a first wire portion located between the first magnet and the second magnet, and a second wire portion located at the other side of the first magnet; the first wire portion corresponds to the second magnet, and the second wire portion corresponds to the first magnet; and wherein when the first coil is conducted, a current direction in the first wire portion and a current direction in the second wire portion have at least components in opposite directions.

In order to achieve the above object, the present disclosure adopts the following technical solution: a voice coil motor, including: a housing, the housing including a first housing and a second housing; a first lens holder, the first lens holder being mounted to the second housing; a second lens holder, the second lens holder being mounted to the first housing; a first electromagnetic drive assembly, the first electromagnetic drive assembly including a first magnetic steel portion and a first coil which cooperates with the first magnetic steel portion to generate a first electromagnetic force; one of the first magnetic steel portion and the first coil being provided on the first housing, the other of the first magnetic steel portion and the first coil being provided on the second lens holder, the first electromagnetic drive assembly being adapted to drive the second lens holder to move in a moving direction; and a second electromagnetic drive assembly, the second electromagnetic drive assembly including a second magnetic steel portion and a second coil which cooperates with the second magnetic steel portion to generate a second electromagnetic force; one of the second magnetic steel portion and the second coil being provided on the second housing, the other of the second magnetic steel portion and the second coil being provided on the first lens holder, the second electromagnetic drive assembly being adapted to drive the first lens holder to move along the moving direction; wherein the first housing includes a first magnetic substance for attracting the first magnetic steel portion, and the second housing includes a second magnetic substance for attracting the second magnetic steel portion; wherein the first magnetic steel portion includes a first magnet and a second magnet, the first magnet includes a first side portion and a second side portion opposite to the first side portion, one of the first side portion and the second side portion is an N pole, the other of the first side portion and the second side portion is an S pole; the second magnet includes a third side portion and a fourth side portion opposite to the third side portion, one of the third side portion and the fourth side portion is an S pole, the other of the third side portion and the fourth side portion is an N pole; the first side portion and the third side portion are located on a same side and have opposite polarities; the second side portion and the fourth side portion are located on a same side and have opposite polarities; wherein the first coil includes a first wire portion located in a place between the first magnet and the second magnet, and a second wire portion located beyond the place; one of the first wire portion and the second wire portion corresponds to the first magnet, and the other of the first wire portion and the second wire portion corresponds to the second magnet; and wherein when the first coil is conducted, a current direction in the first wire portion and a current direction in the second wire portion have at least components in opposite directions.

Compared with the prior art, by making the current direction in the first wire part and the current direction in the second wire part at least have components in opposite directions, component forces along the moving direction and the same direction on the first magnet and the second magnet can be generated in the present disclosure. On one hand, the present disclosure can solve the jam problem of the existing voice coil motor by changing different lens groups to zoom, and on the other hand, it also increases the zoom stroke.

DETAILED DESCRIPTION

Figure 1:
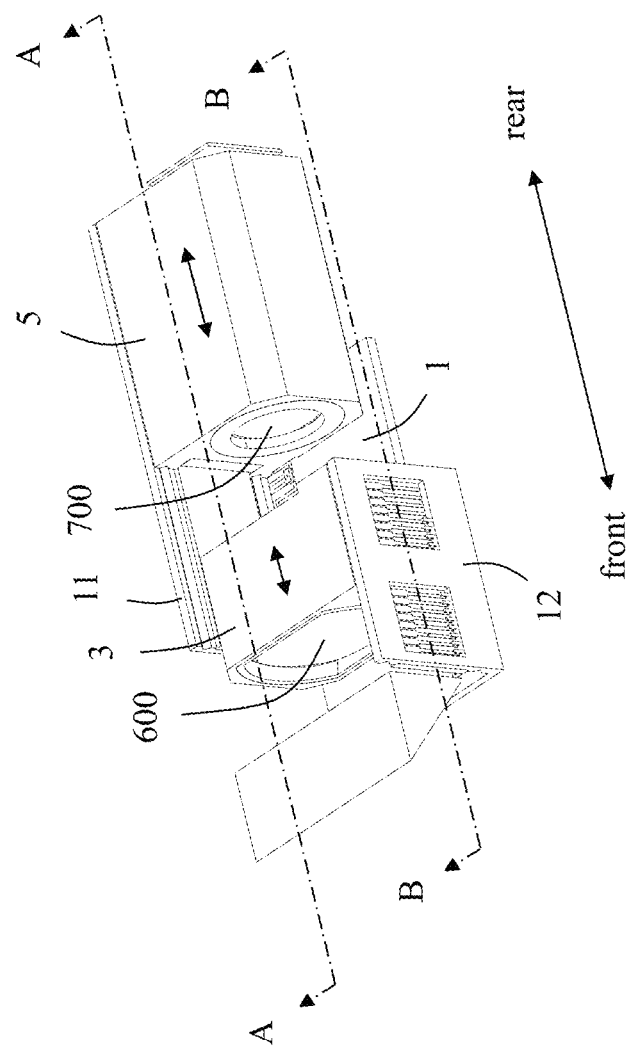
FIG. 1 is a perspective schematic view of a voice coil motor in accordance with a first embodiment of the present disclosure.
Figure 2:
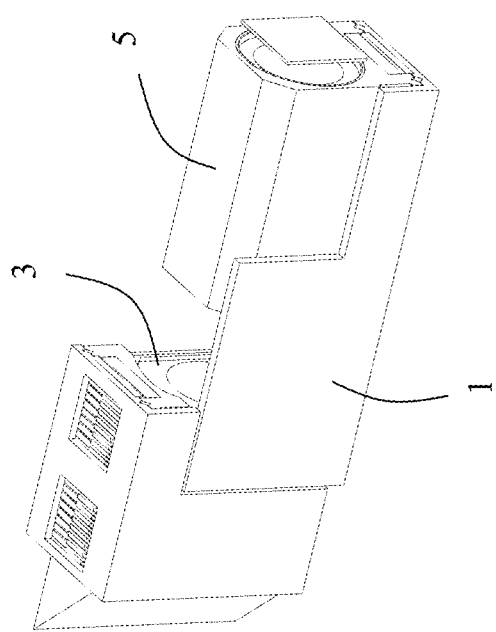
FIG. 2 is a perspective schematic view of FIG. 1 from another angle.
Figure 3:
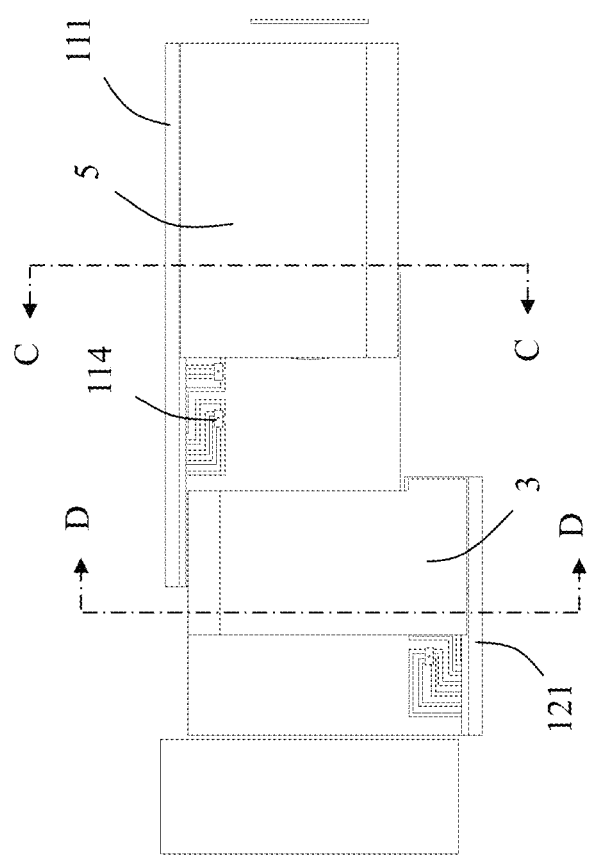
FIG. 3 is a top view of FIG. 1.
Figure 4:
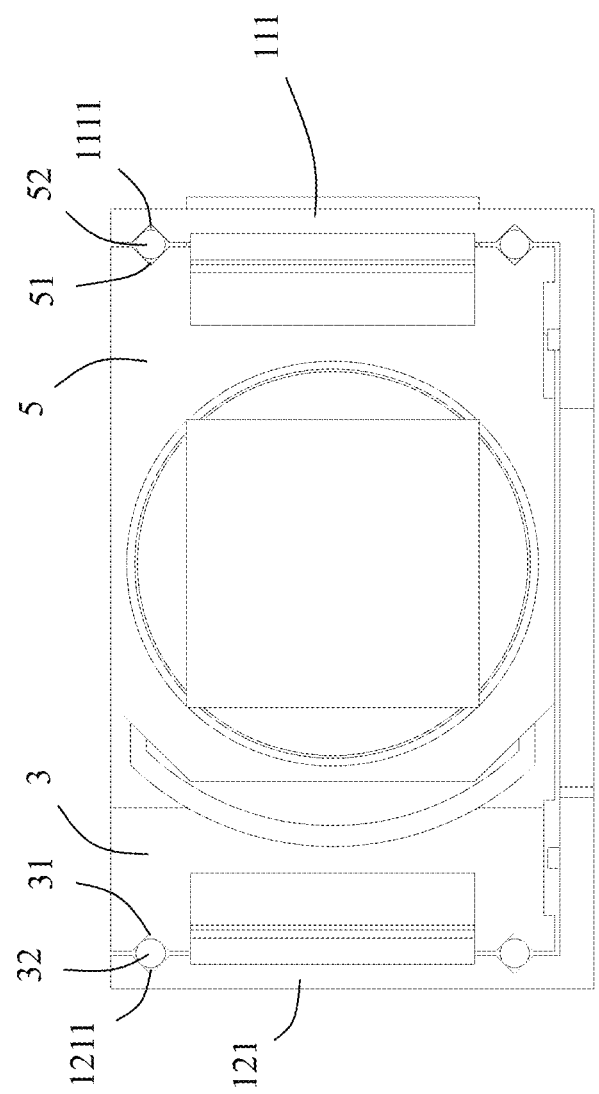
FIG. 4 is a rear view of FIG. 1.
Figure 5:
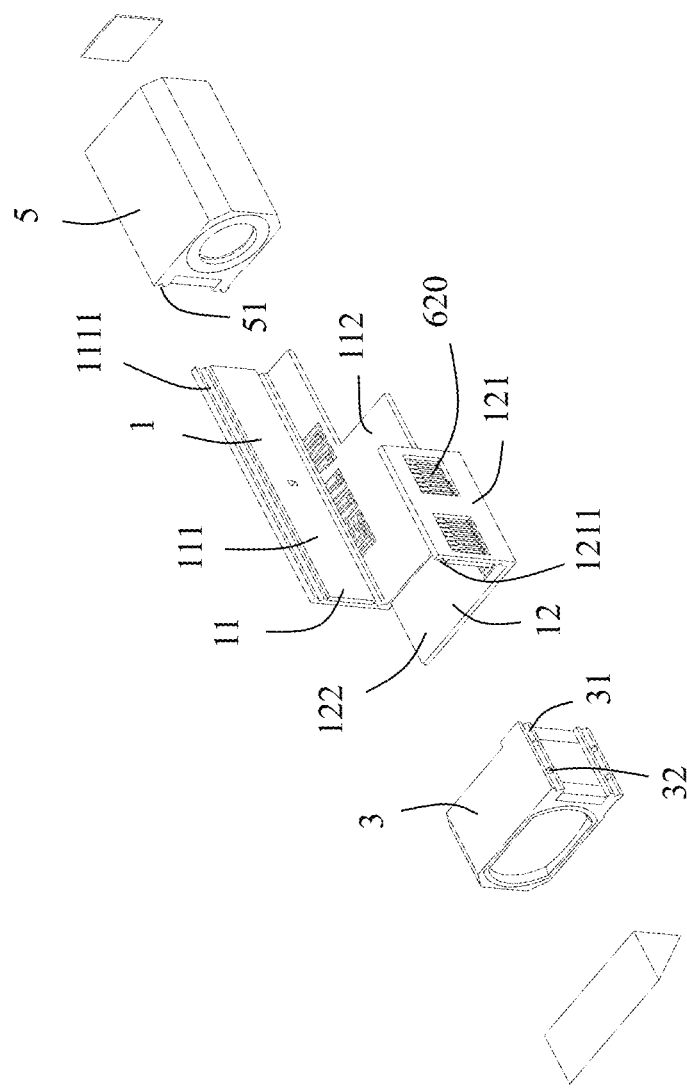
FIG. 5 is a partial perspective exploded view of FIG. 1.
Figure 6:
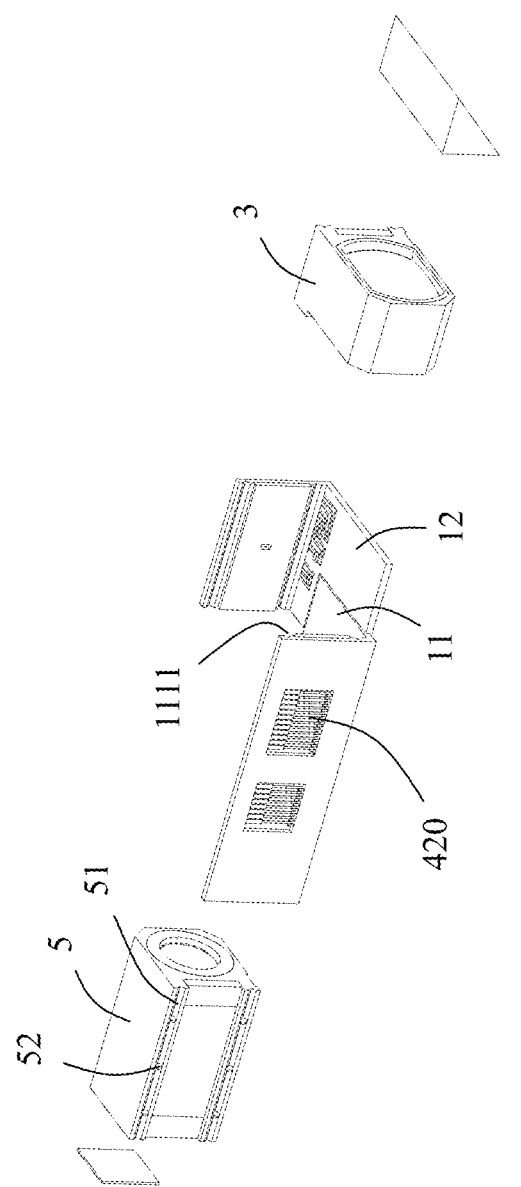
FIG. 6 is a partially exploded perspective view of FIG. 5 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 12, the present disclosure discloses a voice coil motor which is applied to a camera module having a zoom lens 600 and a focus lens 700. The voice coil motor can directly drive the zoom lens 600 to solve the jam problem of the existing voice coil motor when switching between zoom lens and fixed focus lens.

The voice coil motor includes a housing 1, a first lens holder 3 mounted to the housing 1, a first electromagnetic drive assembly 4 for driving the first lens holder 3 to move in a moving direction (for example, a front-to-rear direction), a second lens holder 5 mounted to the housing 1, and a second electromagnetic drive assembly 6 for driving the second lens holder 5 to move along the moving direction. In the illustrated embodiment of the present disclosure, the first lens holder 3 is a zoom lens holder. The second lens holder 5 is a focus lens holder. The first lens holder 3 and the second lens holder 5 are aligned and arranged along the moving direction. In an embodiment of the present disclosure, the first electromagnetic drive assembly 4 and the second electromagnetic drive assembly 6 can cooperate with each other. That is, the first electromagnetic drive assembly 4 and the second electromagnetic drive assembly 6 cooperate with each other to achieve zooming and focusing effects. In addition, during the movement of the first electromagnetic drive assembly 4 and the second electromagnetic drive assembly 6, their components will not interfere with each other. Referring to FIG. 1, in the illustrated embodiment of the present disclosure, the front-to-rear direction is a direction from one end of the housing 1 to the other end of the housing 1. Alternatively, the front-to-rear direction is a focus direction of the focus lens 700. Optionally, the first lens holder 3 may be located in front of the second lens holder 5. Alternatively, the second lens holder 5 is located in front of the first lens holder 3.

In the illustrated embodiment of the present disclosure, the housing 1 includes an L-shaped first housing 11 and an L-shaped second housing 12. In an embodiment of the present disclosure, when assembling, the second lens holder 5 and the first lens holder 3 are assembled to the first housing 11 and the second housing 12, respectively. Then, the first housing 11 and the second housing 12 are combined together. The first housing 11 and the second housing 12 are provided with slots to allow an automated arm of an assembly machine to pass through for easy assembly. The first housing 11 includes a first side wall 111 and a first bottom wall 112 perpendicular to the first side wall 111. The first side wall 111 defines a plurality of first grooves 1111. In the illustrated embodiment of the present disclosure, the first grooves 1111 are arranged in two rows along a vertical direction, and each first groove 1111 is V-shaped. Of course, in other embodiments, the first groove 1111 may also be U-shaped, rectangular, or arc-shaped, which is not limited in the present disclosure.

Similarly, the second housing 12 includes a second side wall 121 and a second bottom wall 122 perpendicular to the second side wall 121. The first side wall 111 and the second side wall 121 are parallel to each other, and the first bottom wall 112 and the second bottom wall 122 are substantially flush. The second side wall 121 defines a plurality of second grooves 1211. In the illustrated embodiment of the present disclosure, the second grooves 1211 are arranged in two rows along the vertical direction, and each second groove 1211 is V-shaped. Of course, in other embodiments, the second groove 1211 may also be U-shaped, rectangular, or arc-shaped, which is not limited in the present disclosure.

The second lens holder 5 includes a plurality of third grooves 51 which cooperate with the first grooves 1111. The voice coil motor includes a plurality of first balls 52 received in the first grooves 1111 and the third grooves 51. The first balls 52 facilitate the movement of the second lens holder 5 relative to the first side wall 111.

The first lens holder 3 includes a plurality of fourth grooves 31 which cooperate with the second grooves 1211. The voice coil motor includes a plurality of second balls 32 received in the second grooves 1211 and the fourth grooves 31. The second balls 32 facilitate the movement of the first lens holder 3 relative to the second side wall 121.

In the illustrated embodiment of the present disclosure, a moving structure of the second lens holder 5 and the first housing 11 and a moving structure of the first lens holder 3 and the second housing 12 are respectively located on the first side wall 111 and the second side wall 121 arranged oppositely, thereby reducing the mutual interference of the two moving structures. Besides, the voice coil motor in the illustrated embodiment of the present disclosure can provide driving force to the first lens holder 3 and the second lens holder 5 at the same time, so that the zoom lens 600 and the focus lens 700 can achieve the purpose of focusing simultaneously while achieving zooming, thereby improving the performance of the voice coil motor.

Of course, it is understandable to those skilled in the art that the movement of the second lens holder 5 relative to the first housing 11 can also be realized in other embodiments, i.e., it can be realized by means of rails, which is not limited in the present disclosure. Similarly, the movement of the first lens holder 3 relative to the second housing 12 can also be realized by other implementations, i.e., it can be realized by means of rails, which is not limited in this disclosure.

Figure 17:
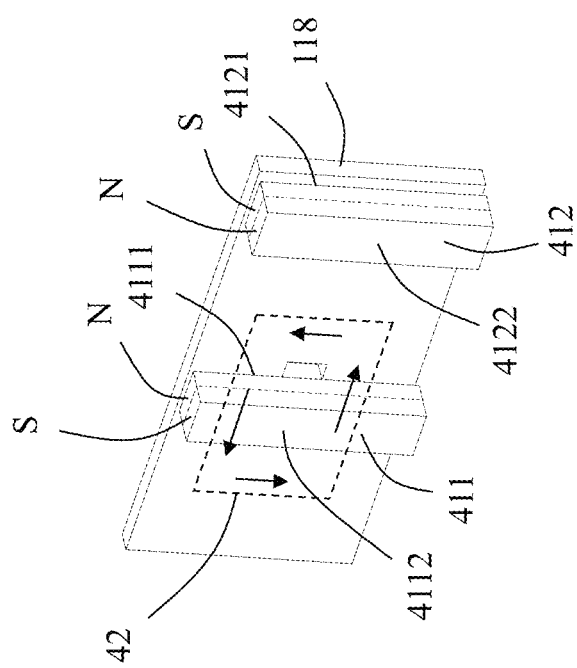
FIG. 17 is a perspective schematic view of the first magnetic steel portion and the first coil fixing plate.
Figure 22:
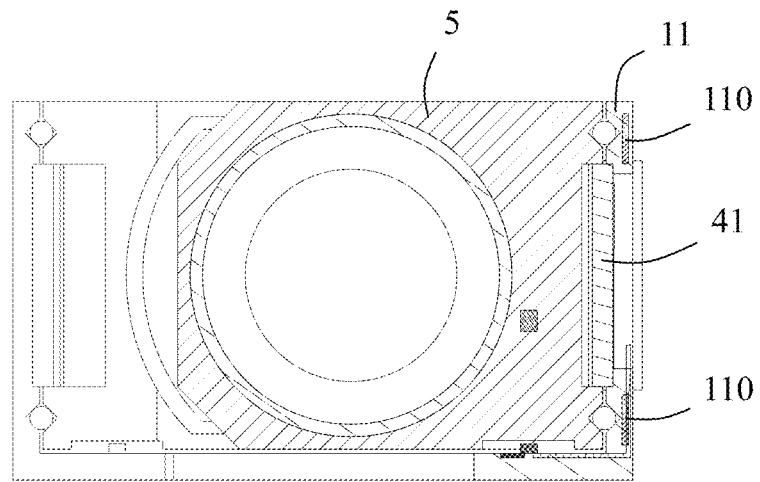
FIG. 22 is a schematic cross-sectional view taken along line C-C in FIG. 3.
Figure 23:
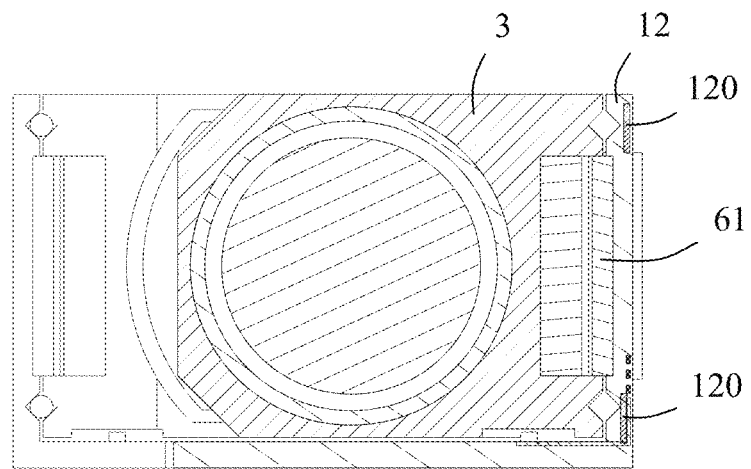
FIG. 23 is a schematic cross-sectional view taken along the line D-D in FIG. 3.
Figure 24:
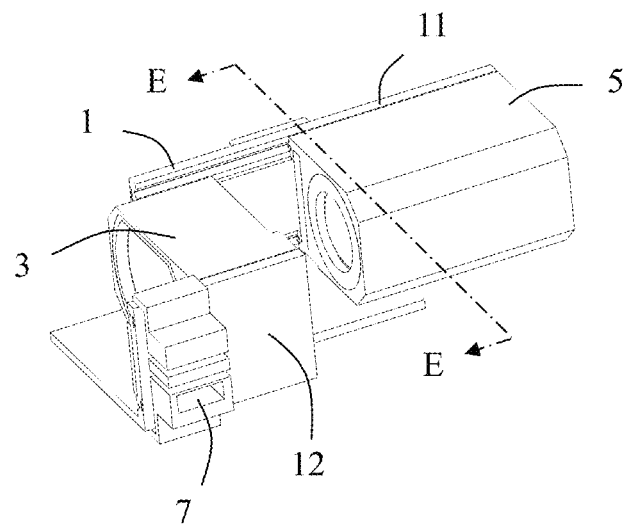
FIG. 24 is a perspective view of the voice coil motor in accordance with a second embodiment of the present disclosure.

As shown in FIG. 17, the first electromagnetic drive assembly 4 includes a first magnetic steel portion 41 and a first coil 42 which cooperates with the first magnetic steel portion 41 so as to generate a first electromagnetic force. One of the first magnetic steel portion 41 and the first coil 42 is provided on the housing 1, and the other of the first magnetic steel portion 41 and the first coil 42 is provided on the second lens holder 5. The first electromagnetic drive assembly 4 is adapted to drive the second lens holder 5 to move in the moving direction. In the illustrated embodiment of the present disclosure, the first magnetic steel portion 41 is provided on the second lens holder 5. The first coil 42 is provided on the housing 1. The housing 1 includes a first coil fixing plate 118. The first coil 42 is a flexible printed circuit board coil. The first coil 42 is fixed on a surface of the first coil fixing plate 118 or the first coil 42 is embedded (for example, press molding) in the first coil fixing plate 118. As shown in FIGS. 22 and 23, the first housing 11 includes a first magnetic substance 110 for attracting the first magnetic steel portion 41. The second housing 12 includes a second magnetic substance 120 for attracting the second magnetic steel portion 61. The first magnetic substance 110 and the second magnetic substance 120 may be the same substance or different substances.

Figure 13:
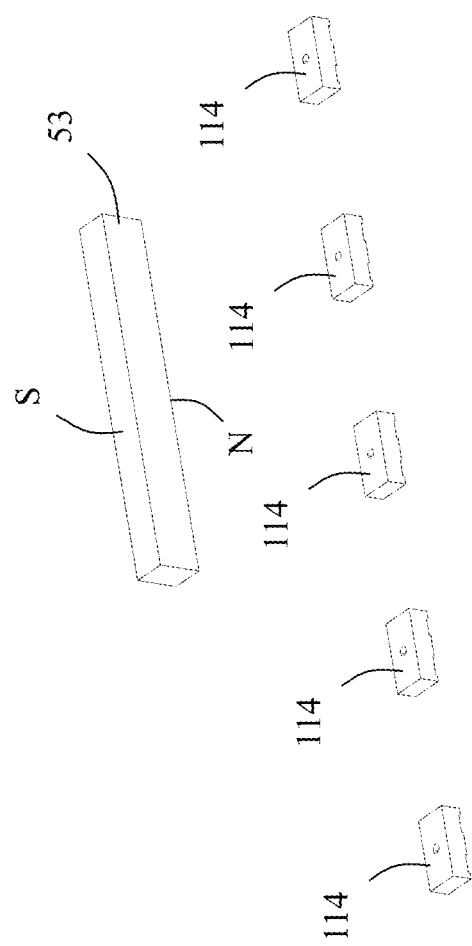
FIG. 13 is a perspective schematic view of a position sensor and an induction magnet in a first embodiment.

As shown in FIG. 13, the voice coil motor includes a magnetic sensor. In an embodiment of the present disclosure, the magnetic sensor includes a plurality of position sensors 114 arranged at intervals along the moving direction. The second lens holder 5 includes an induction magnet 53 for cooperating with the position sensors 114. The induction magnet 53 moves together with the second lens holder 5. In an embodiment of the present disclosure, each position sensor 114 is a Hall sensor.

Figure 14:
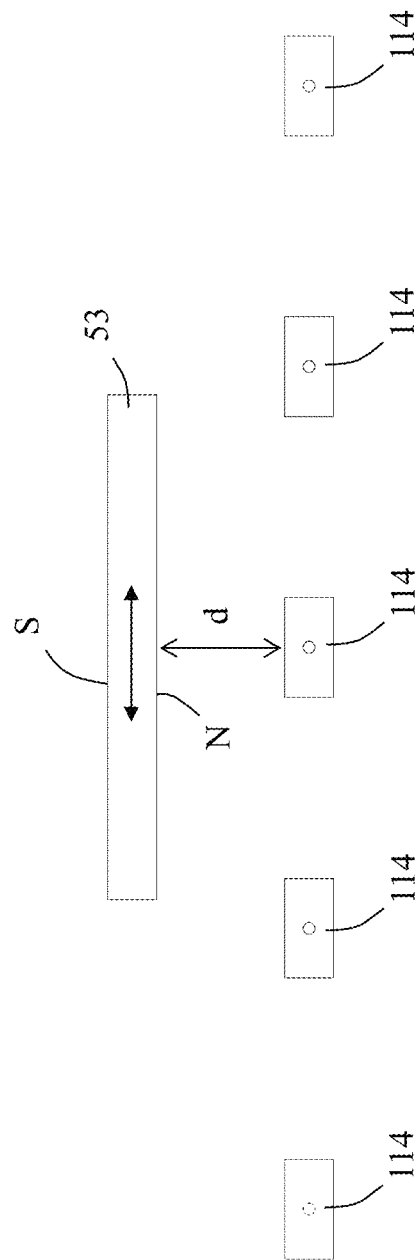
FIG. 14 is a top view of FIG. 13.

Referring to FIGS. 13 to 14, in the first embodiment of the present disclosure, the number of the position sensors 114 is five and they are arranged at intervals along the moving direction. A side of the induction magnet 53 facing the position sensors 114 is an N pole or an S pole, and there is a certain distance d formed between the surface and the position sensors 114. Since each Hall sensor corresponds to a signal curve, the combination of these Hall sensors can form a combined signal curve. The Hall sensor has the function of detecting the magnetic field. When the Hall sensor detects a change in the magnetic field near the induction magnet 53 and can feed back the change to the control unit for calculation, the specific position of the induction magnet 53 can be obtained. Due to the long stroke of the second lens holder 5, in order to accurately detect the magnetic field and accurately obtain the position information of the second lens holder 5, the five Hall sensors are provided in the first embodiment shown in the present disclosure.

Figure 15:
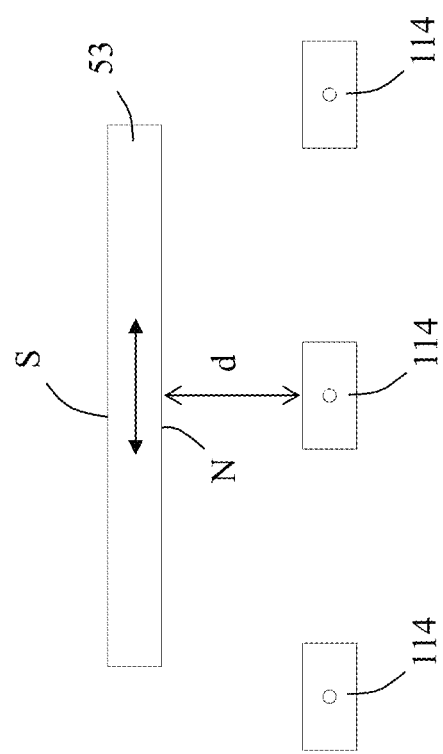
FIG. 15 is a top view of the position sensor and the induction magnet in a second embodiment.

Referring to FIG. 15, in the second embodiment of the present disclosure, the number of the Hall sensors can also be three, thereby reducing the difficulty of layout of electronic components.

Figure 16:
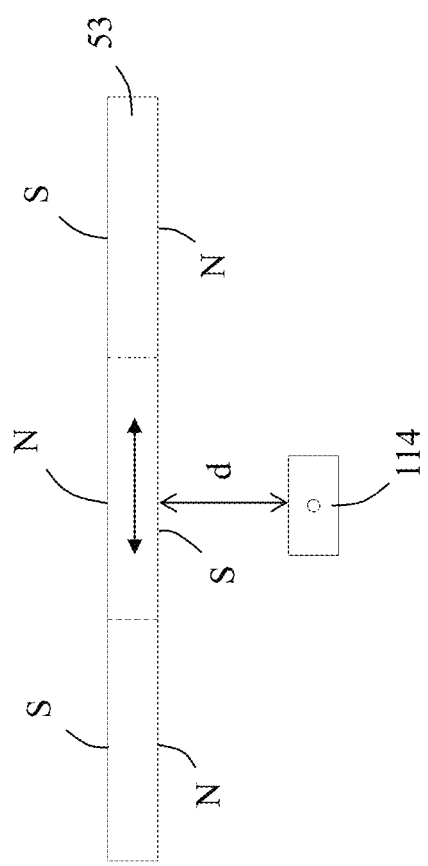
FIG. 16 is a top view of the position sensor and the induction magnet in a third embodiment.

Referring to FIG. 16, in the third embodiment of the present disclosure, the number of the Hall sensor may be only one, so as to minimize the difficulty of layout of the electronic components. A side of the induction magnet 53 facing the position sensor includes a plurality of magnetic poles (N poles and S poles). The plurality of magnetic poles are alternately arranged along the moving direction. When the induction magnet 53 moves along the moving direction with the second lens holder 5, the Hall sensor changes according to detecting the magnetic field near the induction magnet 53. The Hall sensor feeds back the change to the control unit for calculation, and then obtains the specific position of the induction magnet 53 so as to accurately obtain the position information of the second lens holder 5.

Figure 7:
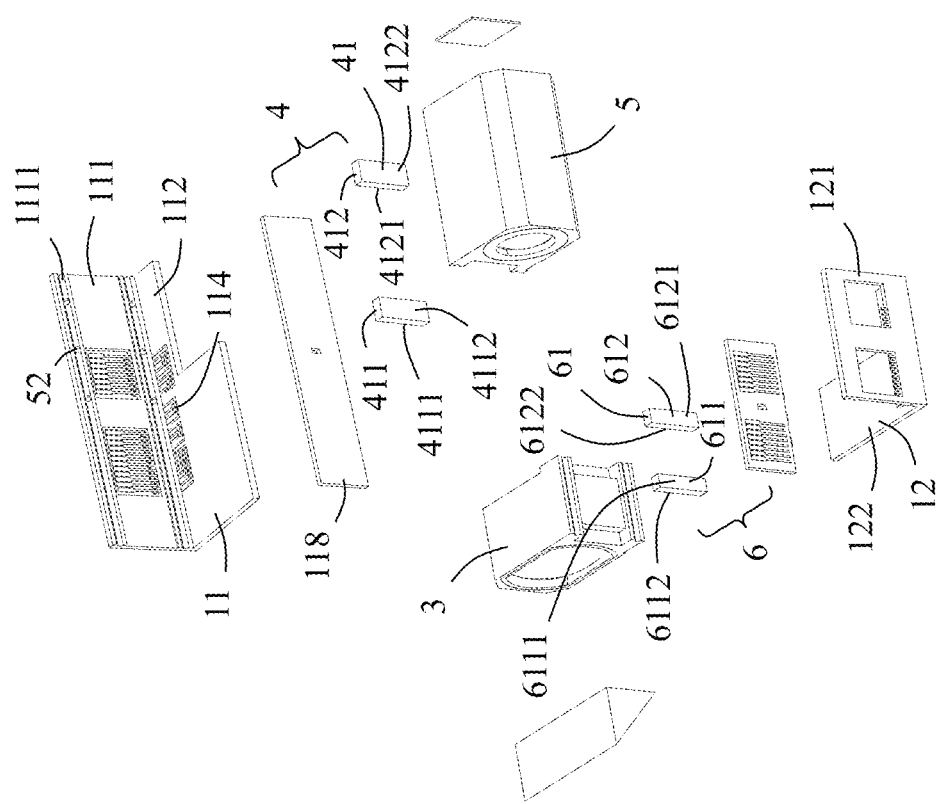
FIG. 7 is a further perspective exploded view of FIG. 5.
Figure 8:
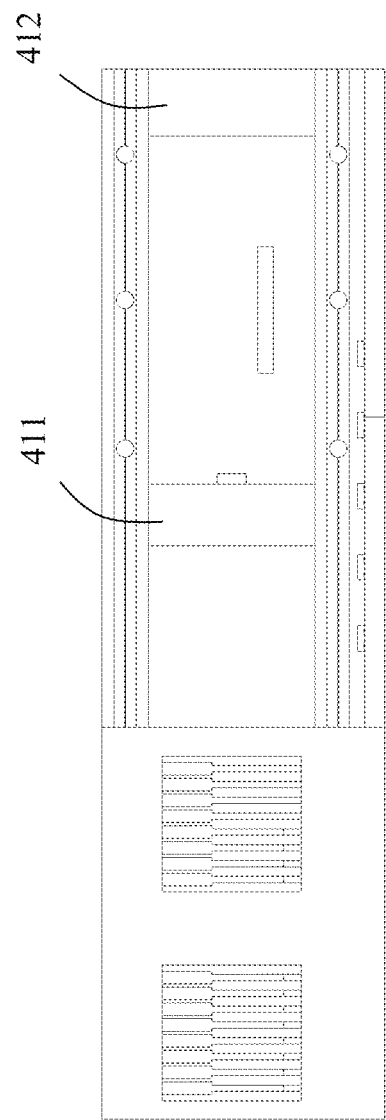
FIG. 8 is a side view of a first magnetic steel portion, a first coil fixing plate, a first housing, a second coil fixing plate, and first balls.
Figure 9:
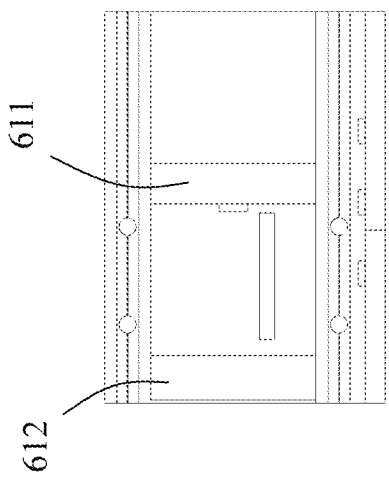
FIG. 9 is a side view of a second magnetic steel portion, a second coil fixing plate, a second housing, a first coil fixing plate and second balls.
Figure 9:
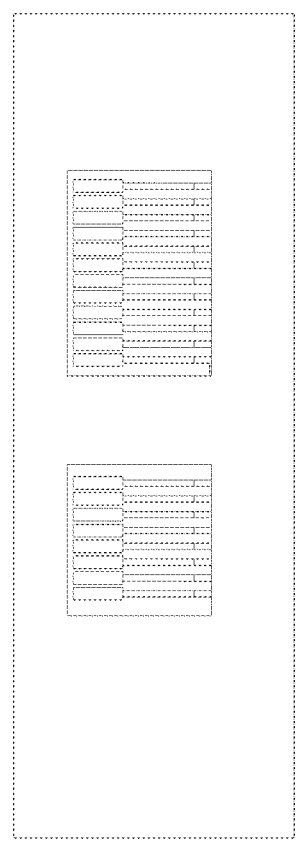
Figure 10:
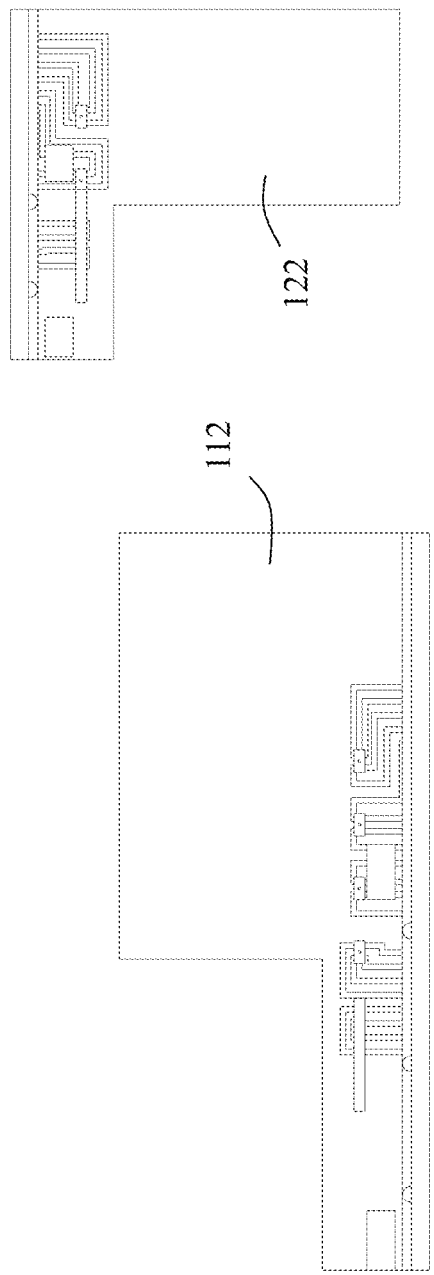
FIG. 10 is a top view of FIG. 9.
Figure 11:
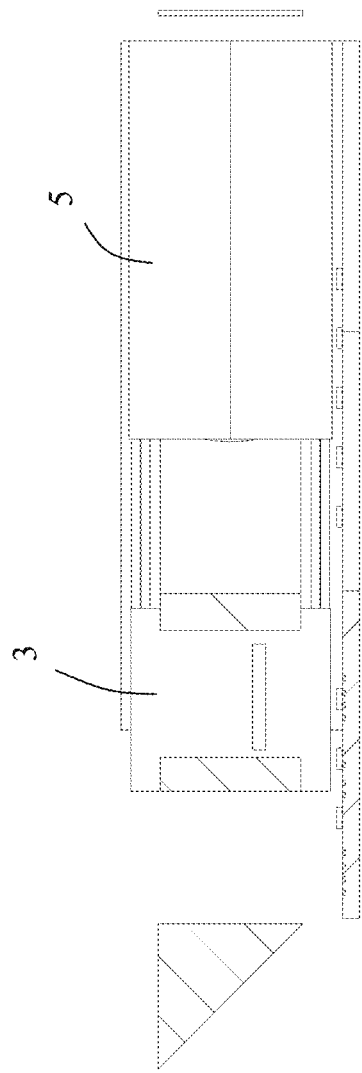
FIG. 11 is a schematic cross-sectional view taken along line A-A in FIG. 1.
Figure 12:
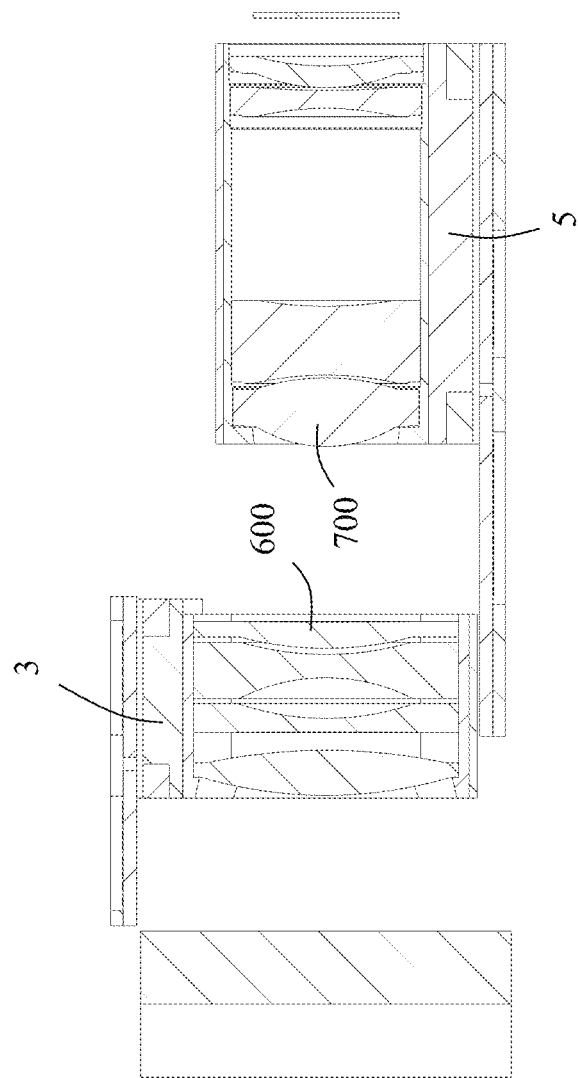
FIG. 12 is a schematic cross-sectional view taken along line B-B in FIG. 1.

Referring to FIGS. 7 and 17, the first magnetic steel portion 41 includes a first magnet 411 and a second magnet 412. The first magnet 411 includes a first side portion 4111 and a second side portion 4112 opposite to the first side portion 4111. One of the first side portion 4111 and the second side portion 4112 is an N pole, and the other of the first side portion 4111 and the second side portion 4112 is an S pole. The second magnet 412 includes a third side portion 4121 and a fourth side portion 4122 opposite to the third side portion 4121. One of the third side portion 4121 and the fourth side portion 4122 is an S pole, and the other of the third side portion 4121 and the fourth side portion 4122 is an N pole. The first side portion 4111 and the third side portion 4121 are located on a same side and have opposite polarities. The second side portion 4112 and the fourth side portion 4122 are located on a same side and have opposite polarities. In the illustrated embodiment of the present disclosure, the first magnet 411 and the second magnet 412 are arranged at intervals along the moving direction. The first magnet 411 and the second magnet 412 are parallel to each other. An extension direction of the first magnet 411 and an extension direction of the second magnet 412 are perpendicular to the moving direction.

Figure 18:
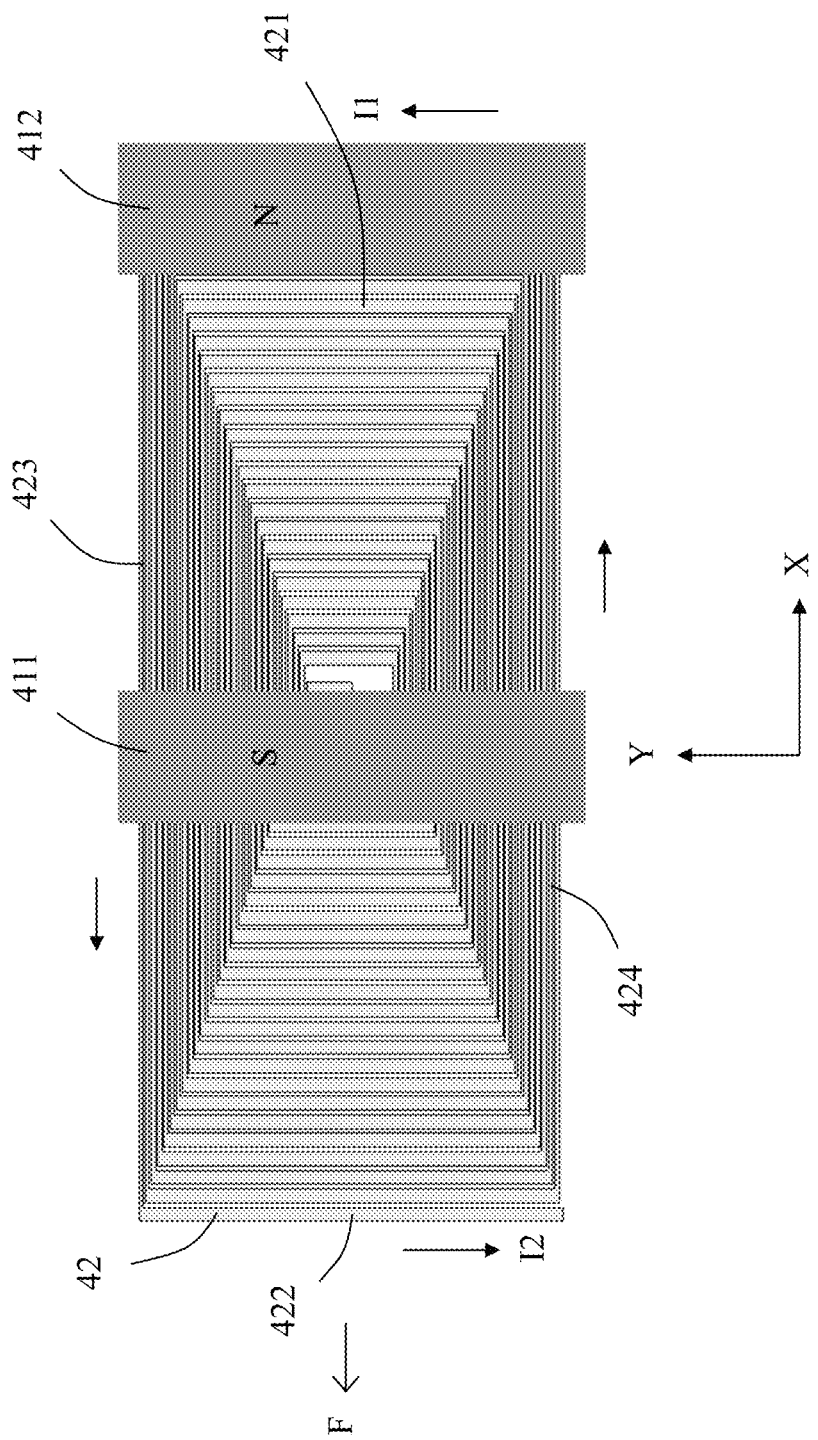
FIG. 18 is a side view of the first magnetic steel portion and the first coil.

Referring to FIG. 18, the first coil 42 includes a first wire portion 421 located between the first magnet 411 and the second magnet 412, and a second wire portion 422 located at the other end of the first magnet 411. In other words, the first magnet 411 is located between the first wire portion 421 and the second wire portion 422, and the second magnet 412 is located along a direction away from the second wire portion 422. The first wire portion 421 corresponds to the first magnet 411. The second wire portion 422 corresponds to the second magnet 412. When the first coil 42 is conducted, a current direction I1 in the first wire portion 421 and a current direction I2 in the second wire portion 422 have at least components in opposite directions. With this arrangement, the first magnet 411 and the second magnet 412 can generate component forces F along the moving direction and in the same direction. Therefore, the generated electromagnetic force in the same direction can make the second lens holder 5 move in the same direction stably. On one hand, this design can solve the jam problem of the existing voice coil motor by changing different lens groups to zoom, and on the other hand, it also increases the zoom stroke.

Specifically, in the illustrated embodiment of the present disclosure, the first coil 42 has a multilayer shape. That is, the first coil 42 is formed by winding several coils with different circumferences layer by layer. The shape of each layer can be rectangular or circular. A back of the first coil 42 is provided with a first conducting piece 420 which allows the assembly machine to control the movement of the motor.

In the illustrated embodiment of the present disclosure, the first coil 42 includes a first connecting portion 423 connecting one side of the first wire portion 421 and one side of the second wire portion 422, and a second connecting portion 424 connecting the other side of the first wire portion 421 and the other side of the second wire portion 422. The number of the first wire portion 421, the number of the second wire portion 422, the number of the first connecting portion 423, and the number of the second connecting portion 424 are multiple, respectively. The first wire portions 421 and the second wire portions 422 are arranged along the first direction X. The first connecting portions 423 and the second connecting portions 424 are arranged along a second direction Y perpendicular to the first direction X. Optionally, a width of the first wire portion 421 and/or the second wire portion 422 of each layer along the first direction X is greater than a width of the first connecting portion 423 and/or the second connecting portion 424 along the second direction Y. This design is beneficial to allow a relatively uniform current in the entire magnet path, thereby improving the linearity of the electromagnetic force, and ensuring the stability of the second lens holder 5 when moving.

Specifically, in an embodiment shown in the present disclosure, the first side portion 4111 is an N pole, and the second side portion 4112 is an S pole. The third side portion 4121 is an S pole, and the fourth side portion 4122 is an N pole. The current direction I1 extends upwardly. The current direction I2 extends downwardly. At this time, both the first magnet 411 and the second magnet 412 can generate a leftward electromagnetic force to drive the second lens holder 5 to move to the left. At this time, if the current direction I1 and the current direction I2 are changed, electromagnetic force in the opposite direction will be generated, thereby driving the second lens holder 5 to move to the right. Compared with the voice coil motor in the prior art that achieves digital zooming through software, the present disclosure adopts the structure and lens design to achieve optical continuous zooming, thereby solving the problem of stuck in the zooming process.

Figure 19:
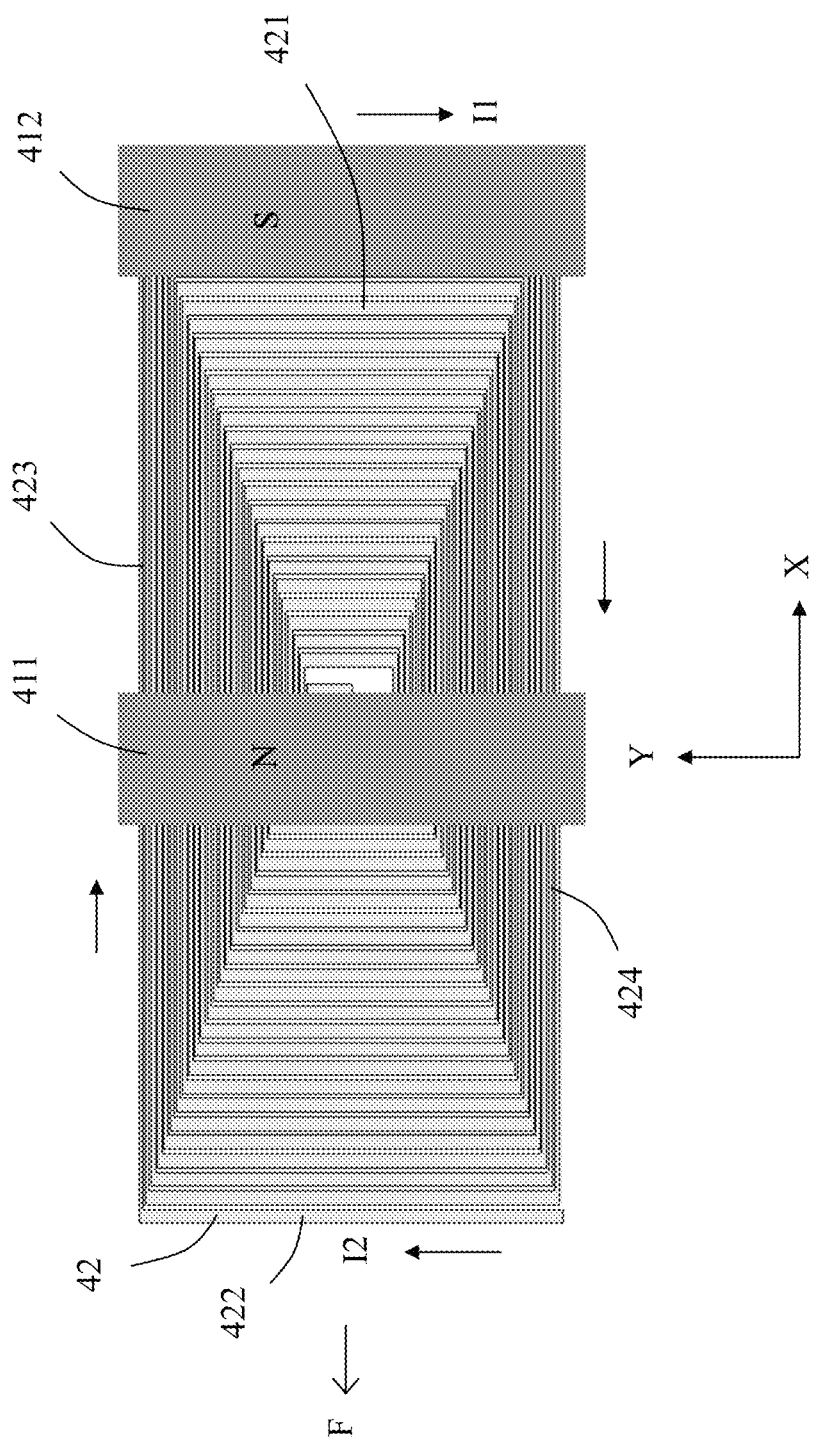
FIG. 19 is a side view of the first magnetic steel portion and the first coil in a second embodiment.

Referring to FIG. 19, it can be understood that, in order to generate the electromagnetic force that drives the second lens holder 5 to move to the left, the first side portion 4111 can also be set to an S pole, and the second side portion 4112 is set to an N pole; the third side portion 4121 is set to an N pole, and the fourth side portion 4122 is set to an S pole; the current direction I1 extends downwardly; the current direction I2 extends upwardly. Similarly, at this time, if the current direction I1 and the current direction I2 are changed, electromagnetic force in the opposite direction will be generated, thereby driving the second lens holder 5 to move to the right.

Figure 20:
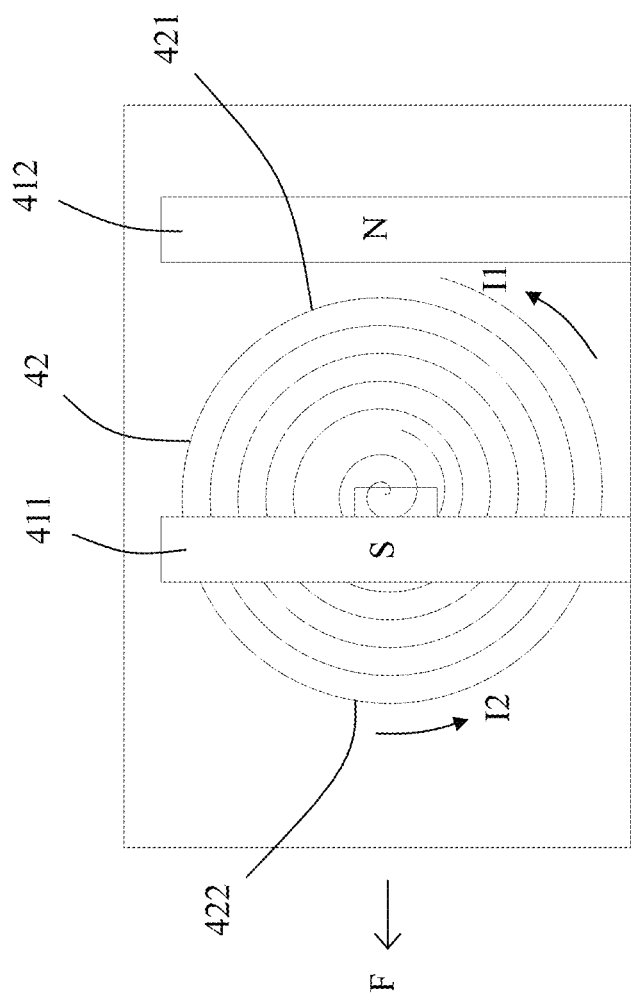
FIG. 20 is a side view of the first magnetic steel portion and the first coil in a third embodiment.

Referring to FIG. 20, in another embodiment, the first coil 42 has a spiral shape, which can also achieve the purpose of the present disclosure.

Figure 21:
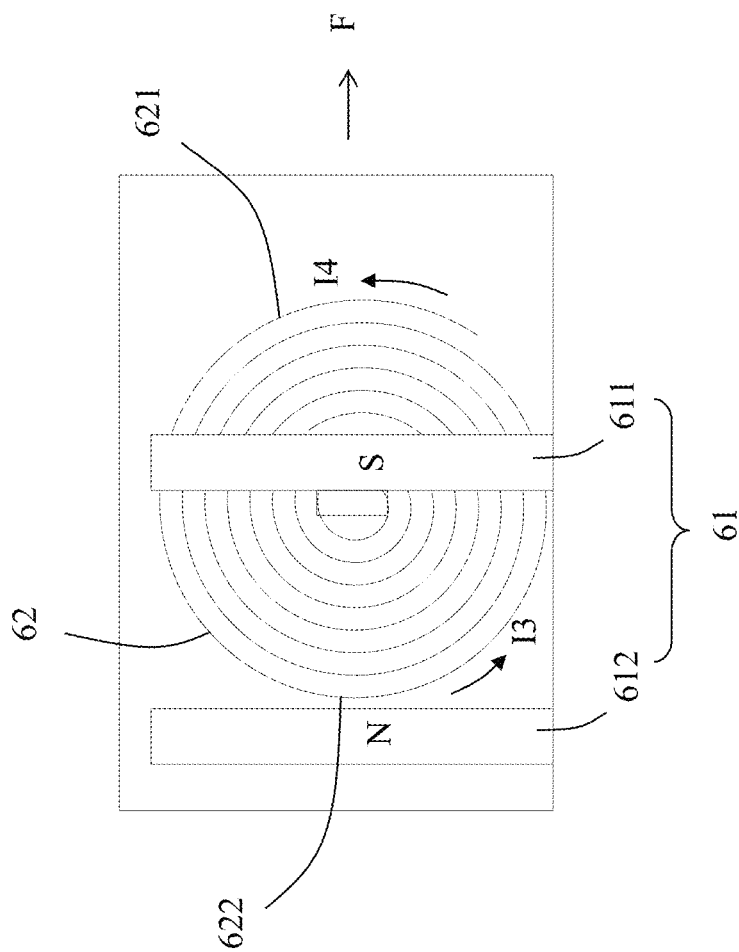
FIG. 21 is a side view of the second magnetic steel portion and the second coil in an embodiment.

Referring to FIG. 21, similar to the principle of the first electromagnetic drive assembly 4, the second electromagnetic drive assembly 6 includes a second magnetic steel portion 61 and a second coil 62 which cooperates with the second magnetic steel portion 61 to generate a second electromagnetic force. A back of the second coil 62 is provided with a second conducting piece 620 which allows the assembly machine to control the movement of the motor. One of the second magnetic steel portion 61 and the second coil 62 is provided on the housing 1, and the other of the second magnetic steel portion 61 and the second coil 62 is provided on the first lens holder 3. The second electromagnetic drive assembly 6 is adapted to drive the first lens holder 3 to move in the moving direction.

Specifically, referring to FIGS. 7 and 21, the second magnet part 61 includes a third magnet 611 and a fourth magnet 612. The third magnet 611 includes a fifth side portion 6111 and a sixth side portion 6112 opposite to the fifth side portion 6111. One of the fifth side portion 6111 and the sixth side portion 6112 is an N pole, and the other of the fifth side portion 6111 and the sixth side portion 6112 is an S pole. The fourth magnet 612 includes a seventh side portion 6121 and an eighth side portion 6122 opposite to the seventh side portion 6121. One of the seventh side portion 6121 and the eighth side portion 6122 is an S pole, and the other of the seventh side portion 6121 and the eighth side portion 6122 is an N pole. The fifth side portion 6111 and the seventh side portion 6121 are located on the same side and have opposite polarities. The sixth side portion 6112 and the eighth side portion 6122 are located on a same side and have opposite polarities. The second coil 62 includes a third wire portion 621 corresponding to the third magnet 611 and a fourth wire portion 622 corresponding to the fourth magnet 612. When the second coil 62 is conducted, a current direction I3 in the third wire portion 621 and a current direction I4 in the fourth wire portion 622 have at least components in opposite directions. With this arrangement, the third magnet 611 and the fourth magnet 612 can generate component forces F along the moving direction and in the same direction. Therefore, the generated electromagnetic force in the same direction can make the first lens holder 3 move in the same direction stably. On one hand, this design can reduce the jam phenomenon in the zoom process, and on the other hand, it also increases the zoom stroke.

The structural design of the second magnetic steel portion 61 can refer to the description of the first magnetic steel portion 41, and the structural design of the second coil 62 can refer to the description of the first coil 42, which will be omitted in detail description in the present disclosure.

Referring to FIGS. 24 to 31, the present disclosure also discloses a voice coil motor in a second embodiment. The voice coil motor of the second embodiment is similar to the voice coil motor of the first embodiment, wherein the same reference numerals represent the same or corresponding technical features. The following describes only the main differences between the two embodiments.

The voice coil motor in the second embodiment includes a housing 1, a first lens holder 3 mounted to the housing 1, a first electromagnetic drive assembly 4 for driving the first lens holder 3 to move in a moving direction (for example, a front-to-rear direction), a second lens holder 5 mounted to the housing 1, a second electromagnetic drive assembly 6 for driving the second lens holder 5 to move along the moving direction, a first connecting device 7 for connecting the first lens holder 3 with an external circuit, and a second connecting device 8 for connecting the second lens holder 5 with an external circuit. By providing the first connecting device 7 and the second connecting device 8, it is convenient to realize the electrical connection of the first lens holder 3 and the second lens holder 5 with the external circuits, thereby reducing the difficulty of client installation.

Figure 25:
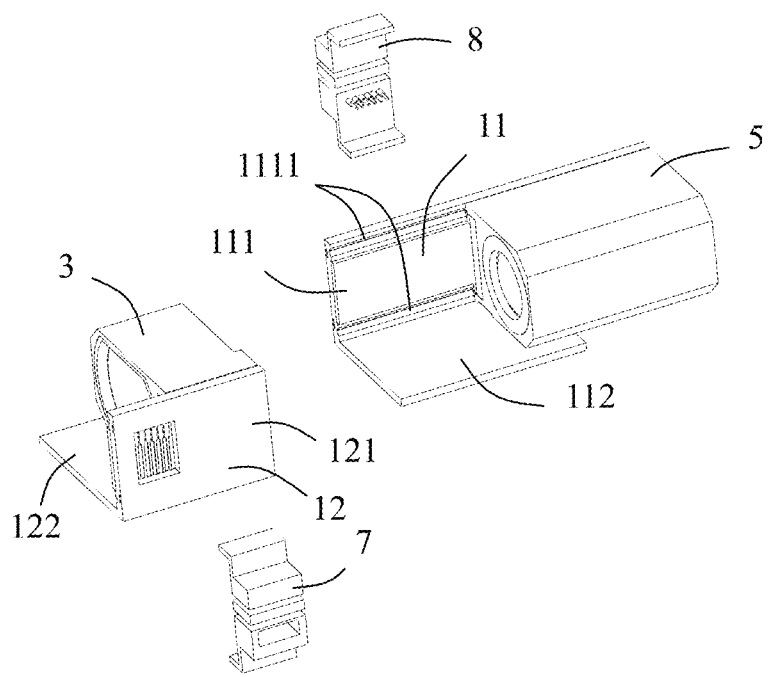
FIG. 25 is a partially exploded perspective view of FIG. 24.

Referring to FIG. 25, the first housing 11 includes a first side wall 111 and a first bottom wall 112 perpendicular to the first side wall 111. The first side wall 111 defines a plurality of first grooves 1111. In the illustrated embodiment of the present disclosure, the first grooves 1111 are arranged in two rows along a vertical direction. Each first groove 1111 is V-shaped.

Figure 26:
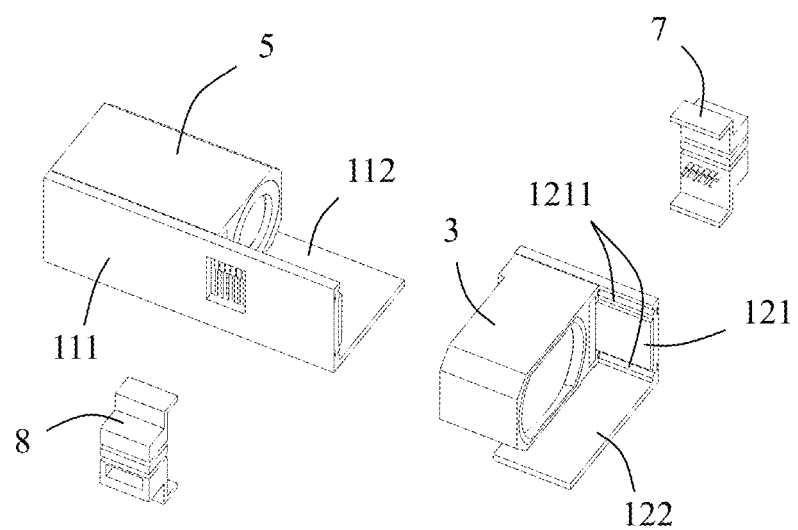
FIG. 26 is a partially exploded perspective view of FIG. 25 from another angle.

Referring to FIG. 26, similarly, the second housing 12 includes a second side wall 121 and a second bottom wall 122 perpendicular to the second side wall 121. The first side wall 111 and the second side wall 121 are parallel to each other. The first bottom wall 112 and the second bottom wall 122 are substantially flush. The second side wall 121 defines a plurality of second grooves 1211. In the illustrated embodiment of the present disclosure, the second grooves 1211 are arranged in two rows along the vertical direction. Each second groove 1211 is V-shaped.

Figure 27:
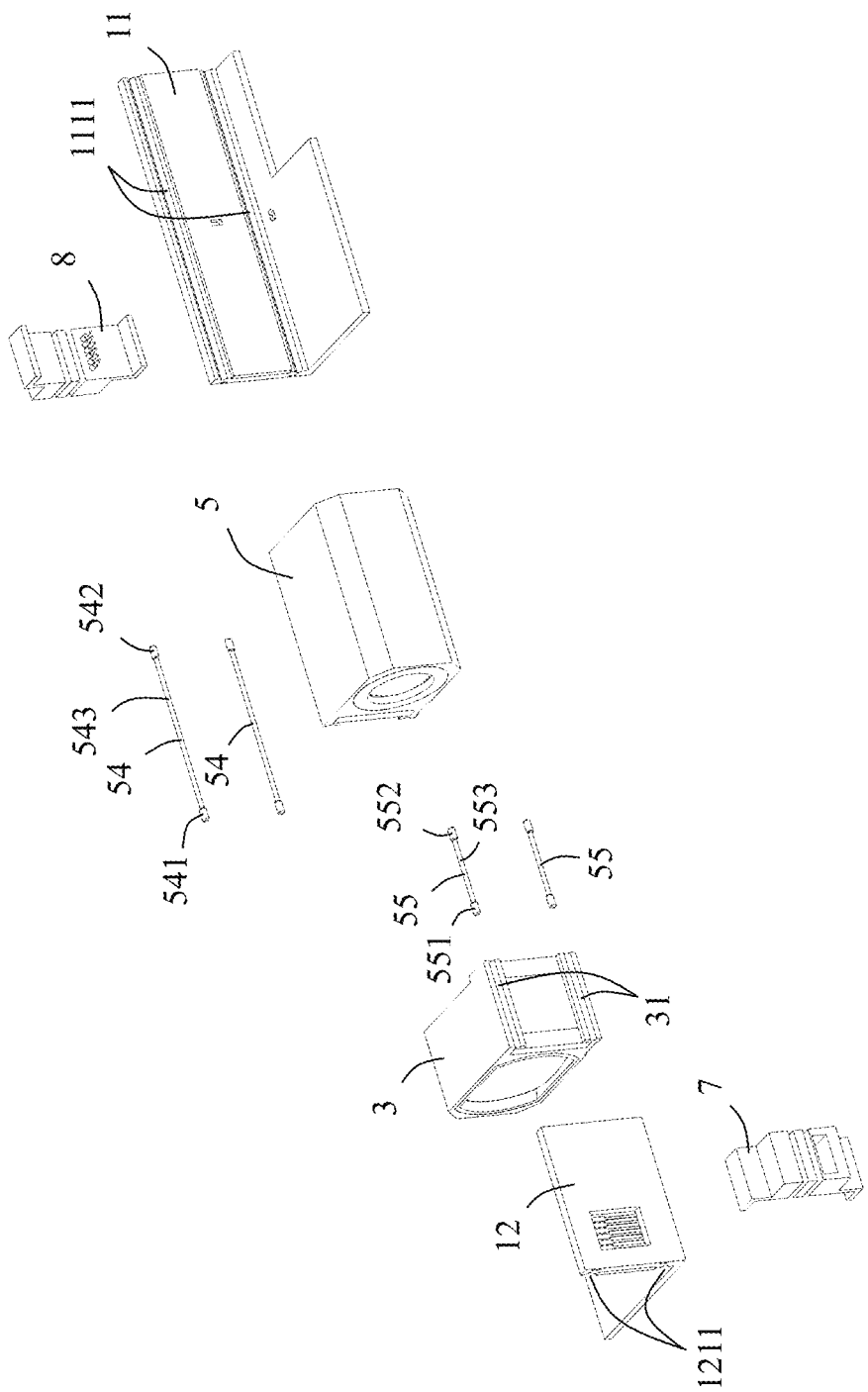
FIG. 27 is a further perspective exploded view of FIG. 25.
Figure 28:
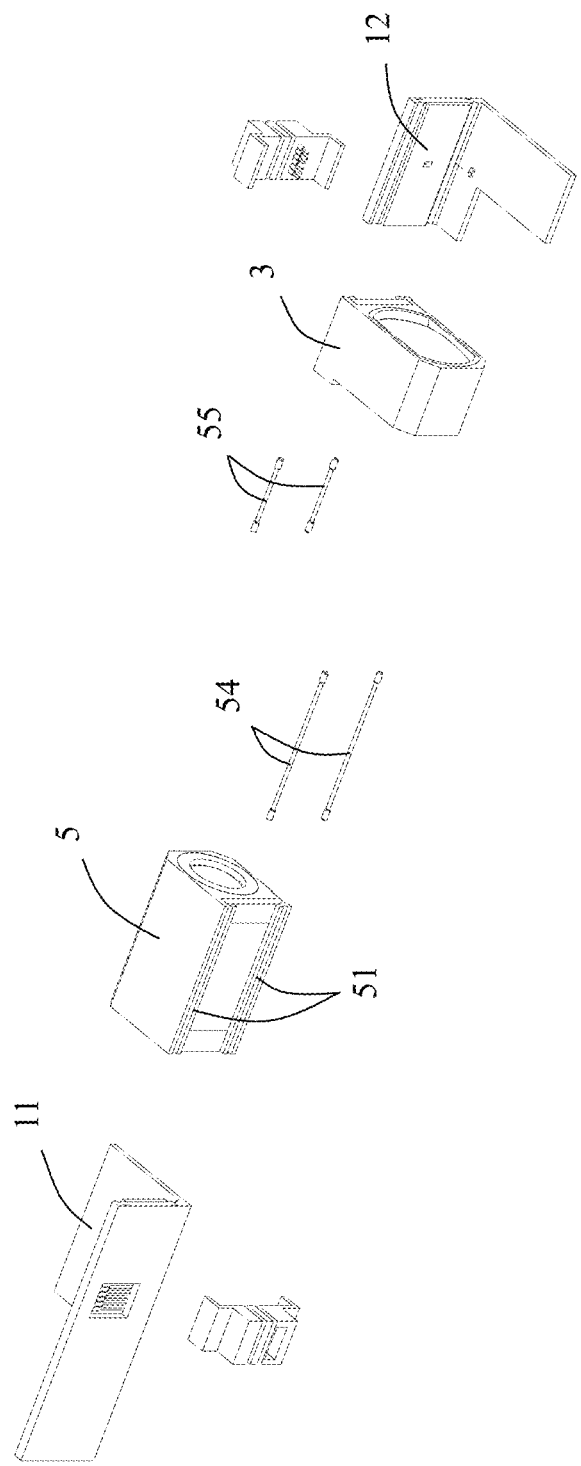
FIG. 28 is a perspective exploded view of FIG. 27 from another angle.
Figure 29:
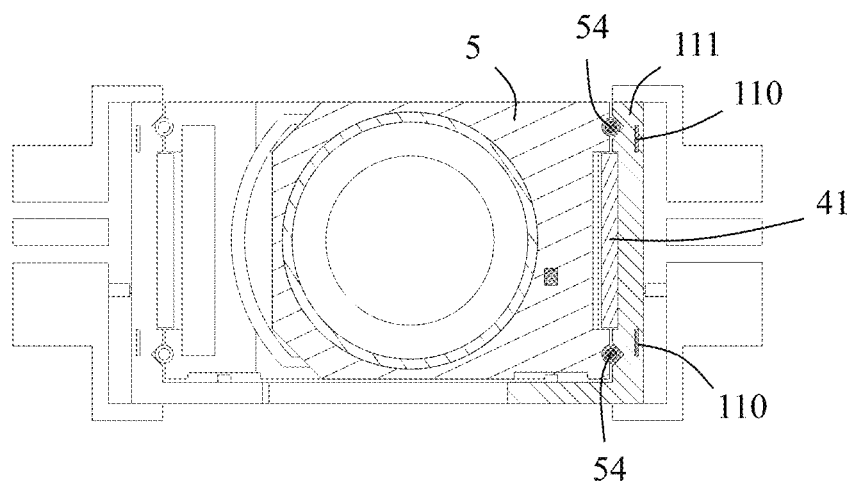
FIG. 29 is a schematic cross-sectional view taken along line E-E in FIG. 24.

Referring to FIG. 27, the second lens holder 5 includes a plurality of third grooves 51 which cooperate with the first grooves 1111. The voice coil motor includes a first columnar protrusion 54 received in the corresponding first groove 1111 and the corresponding third groove 51. The first columnar protrusion 54 is cylindrical. The first columnar protrusion 54 facilitates the movement of the second lens holder 5 relative to the first side wall 111. The first columnar protrusion 54 can provide a better supporting effect, thereby facilitating the sliding of the second lens holder 5 relative to the first side wall 111.

The first lens holder 3 includes a plurality of fourth grooves 31 which cooperate with the second grooves 1211. The voice coil motor includes a second columnar protrusion 55 received in the corresponding second groove 1211 and the corresponding fourth groove 31. The second columnar protrusion 55 is cylindrical. The second columnar protrusion 55 facilitates the movement of the first lens holder 3 relative to the second side wall 121. The second columnar protrusion 55 can provide a better supporting effect, thereby facilitating the sliding of the first lens holder 3 relative to the second side wall 121.

In the illustrated embodiment of the present disclosure, a moving structure of the second lens holder 5 and the first housing 11, and a moving structure of the first lens holder 3 and the second housing 12 are located opposite to each other. The first side wall 111 and the second side wall 121 are arranged so as to reduce the mutual interference of the two moving structures. In addition, the voice coil motor in the illustrated embodiment of the present disclosure can provide driving force to the first lens holder 3 and the second lens holder 5 at the same time, so that the zoom lens 600 and the focus lens 700 can achieve the purpose of focusing simultaneously while achieving zooming, thereby improving the performance of the voice coil motor.

In the illustrated embodiment of the present disclosure, the first columnar protrusion 54 includes a first head 541, a second head 542, and a first connecting rod 543 connecting the first head 541 and the second head 542. The first head 541, the second head 542, and the first connecting rod 543 are all cylindrical. A diameter of the first connecting rod 543 is smaller than a diameter of the first head 541. The diameter of the first connecting rod 543 is smaller than a diameter of the second head 542. The first head 541 and the second head 542 are at least partially received in the first groove 1111 and abut against the first side wall 111. The first connecting rod 543 is not in contact with the first side wall 111 so as to reduce friction and improve the smoothness of movement. Each part of the first columnar protrusion 54 (for example, the first head 541, the second head 542, and the first connecting rod 543) may be integrally formed. Of course, in other embodiments, each part of the first columnar protrusion 54 (for example, the first head 541, the second head 542, and the first connecting rod 543) may also be formed by a combination of two or more elements. For example, it is formed by combining or bonding a cylinder of plastic material and metal material. In this case, a larger space can be provided for a material of the cylinder in contact with the first side wall 111, for example, a material with light weight, wear resistance, and low friction coefficient can be used.

Similarly, the second columnar protrusion 55 includes a third head 551, a fourth head 552, and a second connecting rod 553 connecting the third head 551 and the fourth head 552. A diameter of the second connecting rod 553 is smaller than a diameter of the third head 551. The diameter of the second connecting rod 553 is smaller than a diameter of the fourth head 552. The third head 551, the fourth head 552, and the second connecting rod 553 are all cylindrical. The third head 551 and the fourth head 552 are at least partially received in the second groove 1211 and abut against the second side wall 121. The second connecting rod 553 is not in contact with the second side wall 121 so as to reduce friction and improve the smoothness of movement. Each part of the second columnar protrusion 55 (for example, the third head 551, the fourth head 552, and the second connecting rod 553) may be integrally formed. Of course, in other embodiments, each part of the second columnar protrusion 55 (for example, the third head 551, the fourth head 552, and the second connecting rod 553) may also be formed by a combination of two or more elements. For example, it is formed by combining or bonding a cylinder of plastic material and metal material. In this case, a larger space can be provided for a material of the cylinder in contact with the second side wall 121, for example, a material with light weight, wear resistance, and low friction coefficient can be used.

Figure 30:
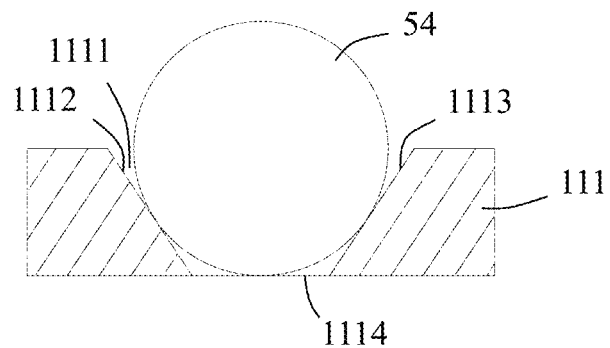
FIG. 30 is a schematic view of a first columnar protrusion and a first groove in another embodiment when they are matched.
Figure 31:
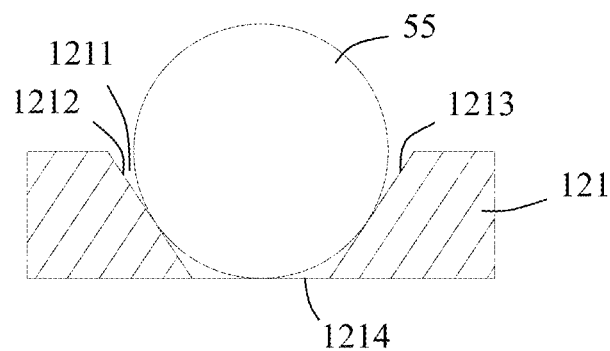
FIG. 31 is a schematic view of a second columnar protrusion and a second groove in another embodiment when they are matched.
Figure 32:
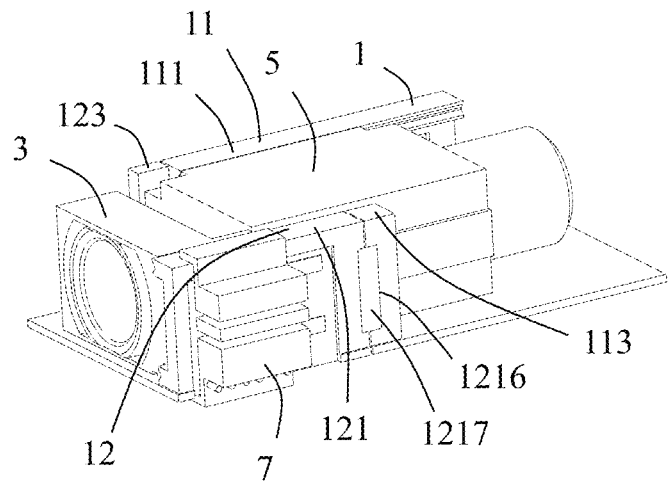
FIG. 32 is a perspective schematic view of the voice coil motor in accordance with a third embodiment of the present disclosure.
Figure 33:
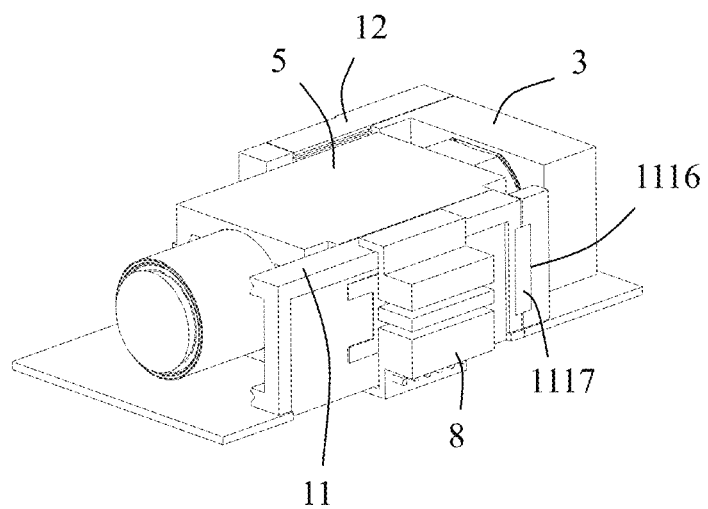
FIG. 33 is a perspective schematic view of FIG. 32 from another angle.
Figure 34:
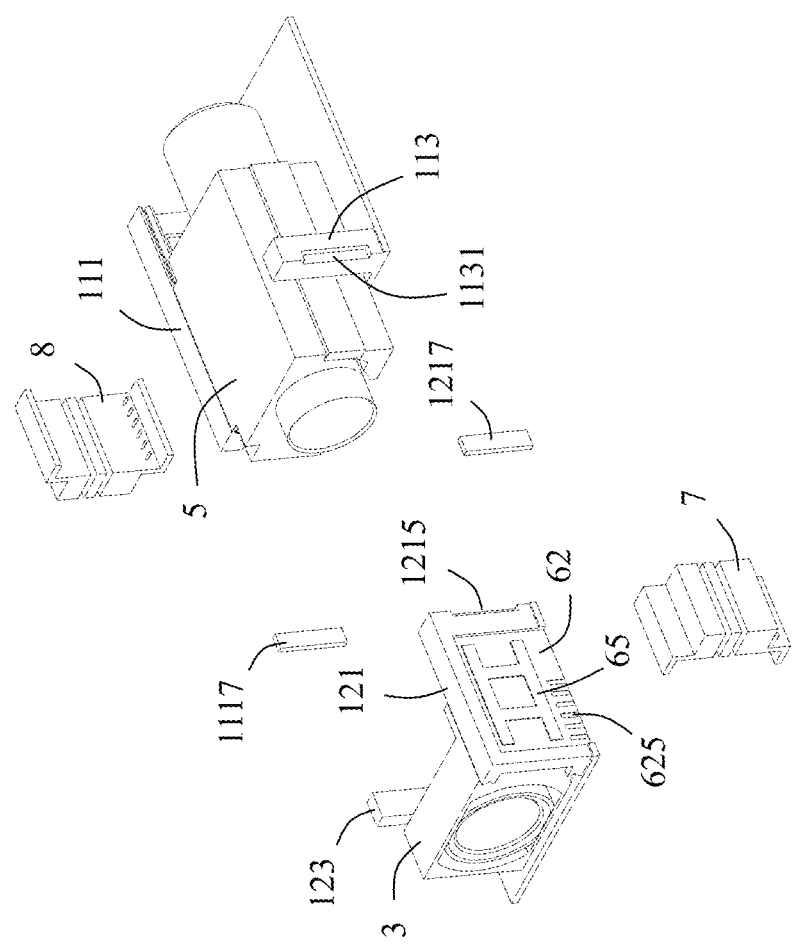
FIG. 34 is a partially exploded perspective view of FIG. 32.
Figure 35:
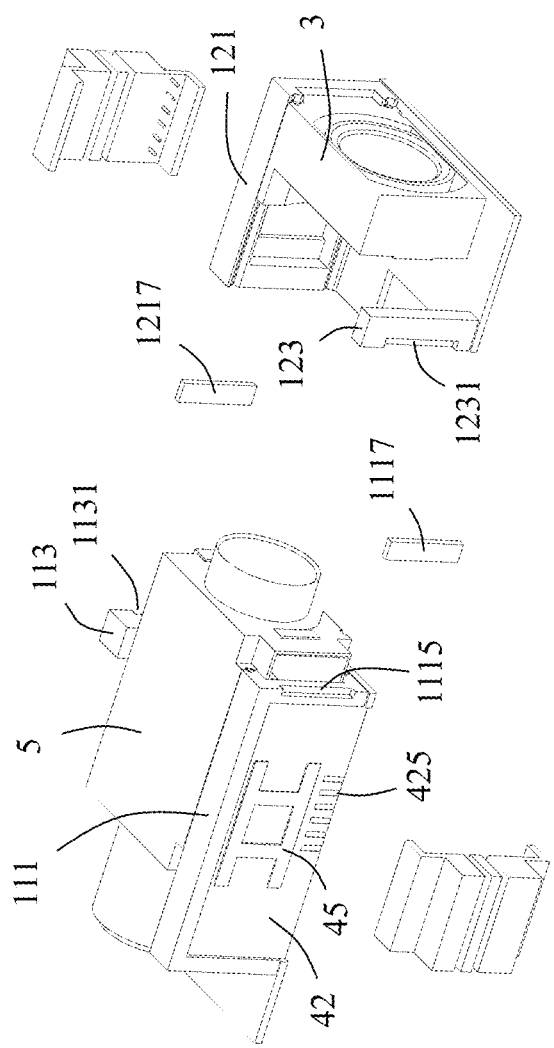
FIG. 35 is a partially exploded perspective view of FIG. 34 from another angle.
Figure 36:
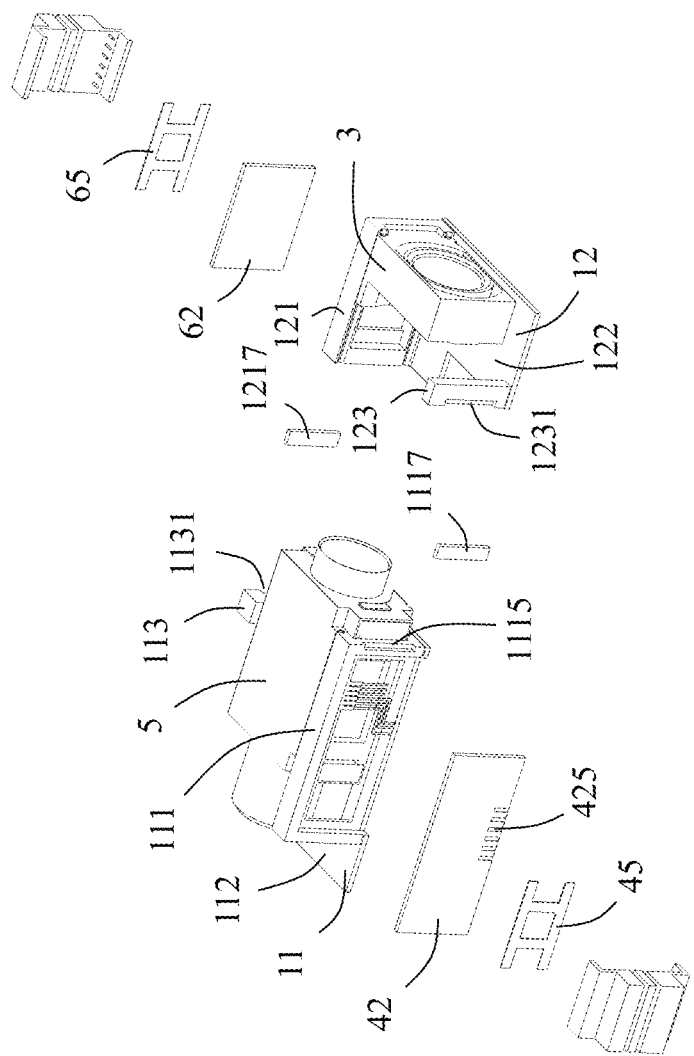
FIG. 36 is a further perspective exploded view of FIG. 35.

Referring to FIGS. 30 and 31, in another embodiment of the present disclosure, the first side wall 111 includes a first inclined surface 1112, a second inclined surface 1113, and a first bottom surface 1114 connecting the first inclined surface 1112 and the second inclined surface 1113. The first inclined surface 1112, the second inclined surface 1113 and the first bottom surface 1114 form the first groove 1111. Inclined directions of the first inclined surface 1112 and the second inclined surface 1113 are opposite so as to form a bell mouth.

Similarly, the second side wall 121 includes a third inclined surface 1212, a fourth inclined surface 1213, and a second bottom surface 1214 connecting the third inclined surface 1212 and the fourth inclined surface 1213. The third inclined surface 1212, the fourth inclined surface 1213 and the second bottom surface 1214 form the second groove 1211. Inclined directions of the third inclined surface 1212 and the fourth inclined surface 1213 are opposite to form a bell mouth.

Referring to FIGS. 32 to 36, the present disclosure also discloses a voice coil motor in a third embodiment. The voice coil motor in the third embodiment is similar to the voice coil motor in the second embodiment, and the same reference numerals represent the same or corresponding technical features. The following describes only the main differences between the two embodiments.

The voice coil motor in the third embodiment includes a housing 1, a first lens holder 3 mounted to the housing 1, a first electromagnetic drive assembly 4 for driving the first lens holder 3 to move in a moving direction (for example, a front-to-rear direction), a second lens holder 5 mounted to the housing 1, a second electromagnetic drive assembly 6 for driving the second lens holder 5 to move along the moving direction, a first connecting device 7 for connecting the first lens holder 3 with an external circuit, and a second connecting device 8 for connecting the second lens holder 5 with an external circuit. By providing the first connecting device 7 and the second connecting device 8, it is convenient to realize that the first lens holder 3 and the second lens holder 5 are connected to the external circuits, thereby reducing the difficulty of client installation.

The first housing 11 includes a first side wall 111, a first bottom wall 112 perpendicular to the first side wall 111, and a first protrusion 113 parallel to the first side wall 111. The first protrusion 113 and the first side wall 111 are located on two sides of the first bottom wall 112, respectively. The first side wall 111 defines a plurality of first grooves 1111. In the illustrated embodiment of the present disclosure, the first grooves 1111 are arranged in two rows along a vertical direction. Each first groove 1111 is V-shaped. The first protrusion 113 defines a first notch 1131 which is open to a side where the first lens holder 3 is located. The first side wall 111 defines a second notch 1115 which is open to a side where the first lens holder 3 is located.

Similarly, the second housing 12 includes a second side wall 121, a second bottom wall 122 perpendicular to the second side wall 121, and a second protrusion 123 parallel to the second side wall 121. The second protrusion 123 and the second side wall 121 are located on two sides of the second bottom wall 122, respectively. The first side wall 111 and the second side wall 121 are parallel to each other. The first bottom wall 112 and the second bottom wall 122 are substantially flush. The second side wall 121 defines a plurality of second grooves 1211. In the illustrated embodiment of the present disclosure, the second grooves 1211 are arranged in two rows along the vertical direction. Each second groove 1211 is V-shaped. The second protrusion 123 is provided with a third gap 1231 which is open to a side where the second lens holder 5 is located. The second side wall 121 defines a fourth notch 1215 which is open to a side where the second lens holder 5 is located.

When assembling, the second notch 1115 and the third notch 1231 face each other and communicate with each other to form a first glue dispensing groove 1116. The first notch 1131 and the fourth notch 1215 face each other and communicate with each other to form a second glue dispensing groove 1216. The voice coil motor includes a first glue filler 1117 filled in the first glue dispensing groove 1116, and a second glue filler 1217 filled in the second glue dispensing groove 1216. This arrangement facilitates the realization of the assembly of the voice coil motor.

In addition, the first coil 42 includes a first soldering piece 425 exposed to the first side wall 111. The voice coil motor includes a first magnetic piece 45 located outside the first coil 42. The first soldering piece 425 is adapted to electrically connect with an external circuit, so as to reduce the difficulty of client installation. Similarly, the second coil 62 includes a second soldering piece 625 exposed to the second side wall 121. The voice coil motor includes a second magnetic piece 65 located outside the second coil 62. The second soldering piece 625 is adapted to electrically connect with an external circuit, so as to reduce the difficulty of client installation.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A voice coil motor, comprising:
   a housing, the housing comprising a first housing and a second housing;
   a first lens holder, the first lens holder being mounted to the second housing;
   a second lens holder, the second lens holder being mounted to the first housing;
   a first electromagnetic drive assembly, the first electromagnetic drive assembly comprising a first magnetic steel portion and a first coil which cooperates with the first magnetic steel portion to generate a first electromagnetic force; one of the first magnetic steel portion and the first coil being provided on the first housing, the other of the first magnetic steel portion and the first coil being provided on the second lens holder, the first electromagnetic drive assembly is for driving the second lens holder to move in a moving direction; and
   a second electromagnetic drive assembly, the second electromagnetic drive assembly comprising a second magnetic steel portion and a second coil which cooperates with the second magnetic steel portion to generate a second electromagnetic force; one of the second magnetic steel portion and the second coil being provided on the second housing, the other of the second magnetic steel portion and the second coil being provided on the first lens holder, the second electromagnetic drive assembly is for driving the first lens holder to move along the moving direction;
   wherein the first housing comprises a first magnetic substance for attracting the first magnetic steel portion, and the second housing comprises a second magnetic substance for attracting the second magnetic steel portion;
   wherein the first magnetic steel portion comprises a first magnet and a second magnet, the first magnet comprises a first side portion and a second side portion opposite to the first side portion, one of the first side portion and the second side portion is an N pole, the other of the first side portion and the second side portion is an S pole; the second magnet comprises a third side portion and a fourth side portion opposite to the third side portion, one of the third side portion and the fourth side portion is an S pole, the other of the third side portion and the fourth side portion is an N pole; the first side portion and the third side portion are located on a same side and have opposite polarities; the second side portion and the fourth side portion are located on a same side and have opposite polarities;
   wherein the first coil comprises a first wire portion located between the first magnet and the second magnet, and a second wire portion located at the other side of the first magnet; the first wire portion corresponds to the second magnet, and the second wire portion corresponds to the first magnet; and
   wherein when the first coil is conducted, a current direction in the first wire portion and a current direction in the second wire portion have at least components in opposite directions.

2. The voice coil motor according to claim 1, wherein the first magnet and the second magnet are arranged at intervals along the moving direction, the first magnet and the second magnet are parallel to each other, and an extension direction of the first magnet and an extension direction of the second magnet are perpendicular to the moving direction.

3. The voice coil motor according to claim 1, wherein the first coil has a multilayer shape, the voice coil motor comprises a first coil fixing plate, the first coil is fixed on a surface of the first coil fixing plate or the first coil is embedded in the first coil fixing plate, and a back of the first coil is provided with a first conducting piece.

4. The voice coil motor according to claim 3, wherein the first coil has a spiral shape.

5. The voice coil motor according to claim 3, wherein the first coil comprises a first connecting portion connecting one side of the first wire portion and one side of the second wire portion, and a second connecting portion connecting the other side of the first wire portion and the other side of the second wire portion; the number of the first wire portion, the number of the second wire portion, the number of the first connecting portion, and the number of the second connecting portion are multiple, respectively; the first wire portion and the second wire portion are arranged along a first direction, the first connecting portion and the second connecting portion are arranged along a second direction perpendicular to the first direction; a width of the first wire portion and/or a width of the second wire portion of each layer in the first direction is greater than a width of the first connecting portion and/or a width of the second connecting portion along the second direction.

6. The voice coil motor according to claim 1, further comprising a magnetic sensor, and the second lens holder comprising an induction magnet the cooperates with the magnetic sensor.

7. The voice coil motor according to claim 1, wherein the first housing comprises a first side wall, the second housing comprises a second side wall parallel to the first side wall, the first side wall defines a first groove, the second lens holder comprises a first columnar protrusion matched with the first groove, the second side wall defines a second groove, and the first lens holder comprises a second columnar protrusion matched with the second groove.

8. The voice coil motor according to claim 7, wherein the first side wall comprises a first inclined surface, a second inclined surface, and a first bottom surface connecting the first inclined surface and the second inclined surface; the first inclined surface, the second inclined surface and the first bottom surface form the first groove; and inclined directions of the first inclined surface and the second inclined surface are opposite so as to form a bell mouth;
   wherein the second side wall comprises a third inclined surface, a fourth inclined surface, and a second bottom surface connecting the third inclined surface and the fourth inclined surface; the third inclined surface, the fourth inclined surface and the second bottom surface form the second groove; and inclined directions of the third inclined surface and the fourth inclined surface are opposite so as to form a bell mouth.

9. The voice coil motor according to claim 8, wherein the first columnar protrusion comprises a first head, a second head, and a first connecting rod connecting the first head and the second head; the first head and the second head are at least partially received in the first groove and abut against the first side wall; and the first connecting rod is not in contact with the first side wall; and wherein the second columnar protrusion comprises a third head, a fourth head, and a second connecting rod connecting the third head and the fourth head; the third head and the fourth head are at least partially received in the second groove and abut against the second side wall, and the second connecting rod is not in contact with the second side wall.

10. The voice coil motor according to claim 1, wherein the second magnetic steel portion comprises a third magnet and a fourth magnet, the third magnet comprises a fifth side portion and a sixth side portion opposite to the fifth side portion, one of the fifth side portion and the sixth side portion is an N pole, and the other of the fifth side portion and the sixth side portion is an S pole; the fourth magnet comprises a seventh side portion and an eighth side portion opposite to the seventh side portion, one of the seventh side portion and the eighth side portion is an S pole, and the other of the seventh side portion and the eighth side portion is an N pole; the fifth side portion and the seventh side portion are located on a same side and have opposite polarities, and the sixth side portion and the eighth side portion are located on a same side and have opposite polarities; and wherein the second coil comprises a third wire portion corresponding to the third magnet and a fourth wire portion corresponding to the fourth magnet; when the second coil is conducted, a current direction in the third wire portion and a current direction in the fourth wire portion have at least components in opposite directions.

11. The voice coil motor according to claim 7, wherein the first housing comprises a first boss defining a first notch, and the first side wall defines a second notch;

the second housing comprises a second boss defining a third notch, and the second side wall defines a fourth notch;

the second notch and the third notch are disposed face to face and communicate with each other to form a first glue dispensing groove; the first notch and the fourth notch are disposed face to face and communicate with each other to form a second glue dispensing groove; the voice coil motor comprises a first glue filler filled in the first glue dispensing groove and a second glue filler filled in the second glue dispensing groove.

12. The voice coil motor according to claim 1, wherein the first coil comprises a first soldering piece exposed to the first housing, and the second coil comprises a second soldering piece exposed to the second housing.

13. A voice coil motor, comprising:
a housing, the housing comprising a first housing and a second housing;
a first lens holder, the first lens holder being mounted to the second housing;
a second lens holder, the second lens holder being mounted to the first housing;
a first electromagnetic drive assembly, the first electromagnetic drive assembly comprising a first magnetic steel portion and a first coil which cooperates with the first magnetic steel portion to generate a first electromagnetic force; one of the first magnetic steel portion and the first coil being provided on the first housing, the other of the first magnetic steel portion and the first coil being provided on the second lens holder, the first electromagnetic drive assembly is for driving the second lens holder to move in a moving direction; and a second electromagnetic drive assembly, the second electromagnetic drive assembly comprising a second magnetic steel portion and a second coil which cooperates with the second magnetic steel portion to generate a second electromagnetic force; one of the second magnetic steel portion and the second coil being provided on the second housing, the other of the second magnetic steel portion and the second coil being provided on the first lens holder, the second electromagnetic drive assembly is for driving the first lens holder to move along the moving direction;

wherein the first housing comprises a first magnetic substance for attracting the first magnetic steel portion, and the second housing comprises a second magnetic substance for attracting the second magnetic steel portion;

wherein the first magnetic steel portion comprises a first magnet and a second magnet, the first magnet comprises a first side portion and a second side portion opposite to the first side portion, one of the first side portion and the second side portion is an N pole, the other of the first side portion and the second side portion is an S pole; the second magnet comprises a third side portion and a fourth side portion opposite to the third side portion, one of the third side portion and the fourth side portion is an S pole, the other of the third side portion and the fourth side portion is an N pole; the first side portion and the third side portion are located on a same side and have opposite polarities; the second side portion and the fourth side portion are located on a same side and have opposite polarities;

wherein the first coil comprises a first wire portion located in a place between the first magnet and the second magnet, and a second wire portion located beyond the place; one of the first wire portion and the second wire portion corresponds to the first magnet, and the other of the first wire portion and the second wire portion corresponds to the second magnet; and wherein when the first coil is conducted, a current direction in the first wire portion and a current direction in the second wire portion have at least components in opposite directions.

14. The voice coil motor according to claim 13, wherein the first magnet and the second magnet are arranged at intervals along the moving direction, the first magnet and the second magnet are parallel to each other, and an extension direction of the first magnet and an extension direction of the second magnet are perpendicular to the moving direction.

15. The voice coil motor according to claim 13, wherein the first coil has a multilayer shape, the voice coil motor comprises a first coil fixing plate, the first coil is fixed on a surface of the first coil fixing plate or the first coil is embedded in the first coil fixing plate.

16. The voice coil motor according to claim 13, further comprising a magnetic sensor, and the second lens holder comprising an induction magnet that cooperates with the magnetic sensor.

17. The voice coil motor according to claim 13, wherein the first housing comprises a first side wall, the second housing comprises a second side wall parallel to the first side wall, the first side wall defines a first groove, the second lens holder comprises a first columnar protrusion matched with the first groove, the second side wall defines a second groove, and the first lens holder comprises a second columnar protrusion matched with the second groove;

wherein the first side wall comprises a first inclined surface, a second inclined surface, and a first bottom surface connecting the first inclined surface and the second inclined surface; the first inclined surface, the second inclined surface and the first bottom surface form the first groove; and inclined directions of the first inclined surface and the second inclined surface are opposite so as to form a bell mouth; and wherein the second side wall comprises a third inclined surface, a fourth inclined surface, and a second bottom surface connecting the third inclined surface and the fourth inclined surface; the third inclined surface, the fourth inclined surface and the second bottom surface form the second groove; and inclined directions of the third inclined surface and the fourth inclined surface are opposite so as to form a bell mouth.

18. The voice coil motor according to claim 17, wherein the first columnar protrusion comprises a first head, a second head, and a first connecting rod connecting the first head and the second head; the first head and the second head are at least partially received in the first groove and abut against the first side wall; and the first connecting rod is not in contact with the first side wall; and wherein the second columnar protrusion comprises a third head, a fourth head, and a second connecting rod connecting the third head and the fourth head; the third head and the fourth head are at least partially received in the second groove and abut against the second side wall, and the second connecting rod is not in contact with the second side wall.

19. The voice coil motor according to claim 13, wherein the second magnetic steel portion comprises a third magnet and a fourth magnet, the third magnet comprises a fifth side portion and a sixth side portion opposite to the fifth side portion, one of the fifth side portion and the sixth side portion is an N pole, and the other of the fifth side portion and the sixth side portion is an S pole; the fourth magnet comprises a seventh side portion and an eighth side portion opposite to the seventh side portion, one of the seventh side portion and the eighth side portion is an S pole, and the other of the seventh side portion and the eighth side portion is an N pole; the fifth side portion and the seventh side portion are located on a same side and have opposite polarities, and the sixth side portion and the eighth side portion are located on a same side and have opposite polarities; and wherein the second coil comprises a third wire portion corresponding to the third magnet and a fourth wire portion corresponding to the fourth magnet; when the second coil is conducted, a current direction in the third wire portion and a current direction in the fourth wire portion have at least components in opposite directions.

20. The voice coil motor according to claim 13, wherein the first coil comprises a first soldering piece exposed to the first housing, and the second coil comprises a second soldering piece exposed to the second housing.

\* \* \* \* \*